US009386410B2

(12) United States Patent
Takaoka

(10) Patent No.: US 9,386,410 B2
(45) Date of Patent: Jul. 5, 2016

(54) INFORMATION PROCESSING APPARATUS, INFORMATION PROCESSING METHOD, AND PROGRAM

(71) Applicant: SONY CORPORATION, Tokyo (JP)

(72) Inventor: Tomohisa Takaoka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/590,298

(22) Filed: Jan. 6, 2015

(65) Prior Publication Data

US 2015/0201301 A1 Jul. 16, 2015

(30) Foreign Application Priority Data

Jan. 16, 2014 (JP) ................................. 2014-005984

(51) Int. Cl.
*H04W 24/00* (2009.01)
*H04W 4/02* (2009.01)
*H04W 4/04* (2009.01)

(52) U.S. Cl.
CPC ............... *H04W 4/02* (2013.01); *H04W 4/046* (2013.01)

(58) Field of Classification Search
CPC .................................. H04W 4/02; H04W 4/046
See application file for complete search history.

(56) References Cited

U.S. PATENT DOCUMENTS

| 9,075,139 B2 * | 7/2015 | Mizuochi ................ G01S 19/26 |
| 2006/0167588 A1 * | 7/2006 | Kong .................... G05D 1/0255 |
| | | 700/245 |
| 2010/0119158 A1 * | 5/2010 | Dalal ................... G06K 9/3275 |
| | | 382/197 |

FOREIGN PATENT DOCUMENTS

JP 2010-122034 A 6/2010

* cited by examiner

*Primary Examiner* — Erin File
(74) *Attorney, Agent, or Firm* — Chip Law Group

(57) ABSTRACT

There is provided an information processing apparatus including a position information acquiring unit configured to acquire first position information of an object, a provisional position and direction information acquiring unit configured to acquire provisional position information and provisional direction information based on a movement of the object with reference to the first position information, when second position information of the object is acquired, and a direction correcting unit configured to calculate a direction correction amount for correcting the provisional direction information, according to a distance between the first position information and the second position information, on the basis of the first position information, the second position information, and the provisional position information.

19 Claims, 20 Drawing Sheets

FIG.5

| TRANSMITTER ID 1320 | LATITUDE 1322 | LONGITUDE 1324 |
|---|---|---|
| ABC001 | 35.690 | 139.694 |
| ABC002 | 35.690 | 139.692 |
| ABC003 | 35.692 | 139.692 |
| XXX501 | 34.694 | 135.502 |
| ⋮ | ⋮ | ⋮ |

$$\theta_{max} = \sin^{-1} \frac{2R}{L}$$

INFORMATION PROCESSING APPARATUS, INFORMATION PROCESSING METHOD, AND PROGRAM

CROSS REFERENCE TO RELATED APPLICATIONS

This application claims the benefit of Japanese Priority Patent Application JP 2014-005984 filed Jan. 16, 2014, the entire contents of which are incorporated herein by reference.

BACKGROUND

The present disclosure relates to an information processing apparatus, an information processing method, and a program.

In the past, there has been developed a positioning technology that executes autonomous position estimation in a portable terminal such as for example a smartphone, utilizing a built-in acceleration sensor or the like. Because this kind of autonomous positioning technology has an issue of an error accumulating while traveling, a technology for correcting the error has been also proposed in recent years.

For example, JP 2010-122034A discloses a technology in which an in-vehicle device mounted on a vehicle calculates a relative route of the vehicle. Each time the vehicle passes just below a light beacon installed on the road, the in-vehicle device receives an absolute position coordinate from the light beacon, and calculates a correction value from the relationship between two absolute positions and two relative positions when receiving the two absolute positions. Then, the in-vehicle device calculates an absolute traveling route of the vehicle in the absolute coordinate system, from the correction value and the relative route.

SUMMARY

In the meantime, same position information is supposed to be acquired in a certain range, depending on the situation and the environment of positioning.

Assuming that the technology described in JP 2010-122034A is applied to the above case, an inappropriate correction value might be calculated in the technology described in JP 2010-122034A. For example, the technology described in JP 2010-122034A calculates a correction value without considering the distance between the light beacons used in the positioning. If the position of the vehicle is away from the position of the light beacon when the vehicle receives a position coordinate from the light beacon, the correction value might be an inappropriate value due to the error included in the calculated correction value, which increases as the distance between the light beacons becomes shorter.

Therefore, the present disclosure proposes a novel and improved information processing apparatus, an information processing method, and a program capable of adaptively correcting direction information in a situation in which same position information is acquired in a certain range.

In order to solve the above issues, according to one aspect of the present disclosure, there is provided an information processing apparatus including a position information acquiring unit configured to acquire first position information of an object, a provisional position and direction information acquiring unit configured to acquire provisional position information and provisional direction information based on a movement of the object with reference to the first position information, when second position information of the object is acquired, and a direction correcting unit configured to calculate a direction correction amount for correcting the provisional direction information, according to a distance between the first position information and the second position information, on the basis of the first position information, the second position information, and the provisional position information.

Also, in order to solve the above issues, there is provided an information processing method including acquiring first position information of an object, acquiring provisional position information and provisional direction information based on a movement of the object with reference to the first position information, when second position information of the object is acquired, and calculating, by a processor, a direction correction amount for correcting the provisional direction information, according to a distance between the first position information and the second position information, on the basis of the first position information, the second position information, and the provisional position information.

Also, in order to solve the above issues, there is provided a program for causing a computer to function as a position information acquiring unit configured to acquire first position information of an object, a provisional position and direction information acquiring unit configured to acquire provisional position information and provisional direction information based on a movement of the object with reference to the first position information, when second position information of the object is acquired, and a direction correcting unit configured to calculate a direction correction amount for correcting the provisional direction information, according to a distance between the first position information and the second position information, on the basis of the first position information, the second position information, and the provisional position information.

As described above, according to one or more of embodiments of the present disclosure, the direction information is adaptively corrected in the situation in which the same position information is acquired in a certain range. Note that the effect described herein is not necessarily restrictive, but may be one of the effects described in the present disclosure.

BRIEF DESCRIPTION OF THE DRAWINGS

FIG. 5 is an explanatory diagram illustrating an exemplary configuration of a transmitter database 132 according to the first embodiment;

DETAILED DESCRIPTION OF THE EMBODIMENT(S)

Figure 1:
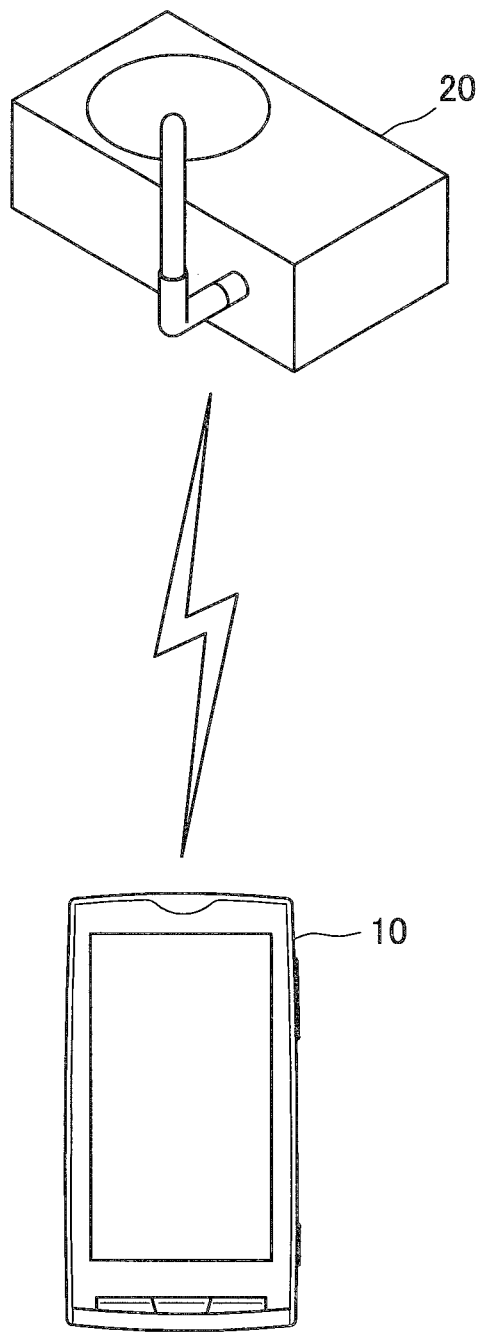
FIG. 1 is an explanatory diagram illustrating a basic configuration of an information processing system which is common in each embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, embodiments will be described in the order of items listed below:
1. Background
2. Basic Configuration of Information Processing System
   2-1. Information Processing Apparatus 10
   2-2. Transmitter 20
3. Detailed Description of Each Embodiment
   3-1. First Embodiment
   3-2. Second Embodiment
   3-3. Third Embodiment
   3-4. Fourth Embodiment
   3-5. Fifth Embodiment
4. Variant Example <<1. Background>>

The present disclosure can be embodied in various forms, as describe in detail in "3-1. First Embodiment" to "3-5. Fifth Embodiment" for example. First, in order to explicitly describe the feature of the embodiments of the present disclosure, description will be made of the background that has led the information processing apparatus according to the embodiments of the present disclosure to be created.

In the past, there has been developed a positioning technology that executes autonomous position estimation in a portable terminal such as for example a smartphone, utilizing a built-in acceleration sensor or the like. However, this kind of autonomous positioning technology has an issue of an error accumulating while traveling.

Also, in the past, an indoor absolute positioning technology has been developed as a technology for acquiring position information within door. The indoor absolute positioning technology is the technology for acquiring absolute position information using, for example, Bluetooth (registered trademark), Wi-Fi (registered trademark), IMES (Indoor MEssaging System), RFID (Radio Frequency IDentificatiion), or the like. In the indoor absolute positioning technology, the receiver such as for example a portable terminal receives radio waves that convey the position information of a transmitter transmitted from the transmitter, in order to acquire the absolute position information.

In the meantime, from a view point of cost, it is not preferable to locate a large number of transmitters within door. Also, if the radio wave of the transmitter is intensified, the radio-wave reaching range expands to expand the area in which the positioning is executable, while the accuracy of the positioning deteriorates and the electric power consumption increases disadvantageously.

Therefore, from two view points of the extent of the range within which the positioning is executable and of the cost reduction, it is desirable to configure a following information processing system. First, the transmitter is configured such that the radio-wave reaching range is set small and the position information itself of the transmitter is transmitted with the radio waves. Also, the receiver is preferably configured such that the autonomous positioning is executed using a sensor and the identified autonomous position information and the identified autonomous direction information are appropriately corrected on the basis of the position information received from the transmitter.

Therefore, in view of the above circumstances, the information processing apparatus 10 according to embodiments of the present disclosure has been created. The information processing apparatus 10 adaptively corrects the direction information in the situation in which the same position information is acquired in a certain range.

<<2. Basic Configuration Of Information Processing System>>

Next, description will be made of a basic configuration of the information processing system which is common in each embodiment, with reference to FIG. 1. As illustrated in FIG. 1, the information processing system according to each embodiment includes an information processing apparatus 10 and a transmitter 20.

<2-1. Information Processing Apparatus 10>

The information processing apparatus 10 is an example of the object and the information processing apparatus in an embodiment of the present disclosure. The information processing apparatus 10 is a device of high portability, for example portable by a user. For example, the information processing apparatus 10 may be a portable phone such as a smartphone, a PDA (Personal Digital Assistant), a digital camera, a wearable computer, a game machine, or the like.

The information processing apparatus 10 is capable of the autonomous positioning on the basis of the measurement result by an acceleration sensor 166 and a gyroscope 168 described later.

[2-1-1. Hardware Configuration]

Figure 2:
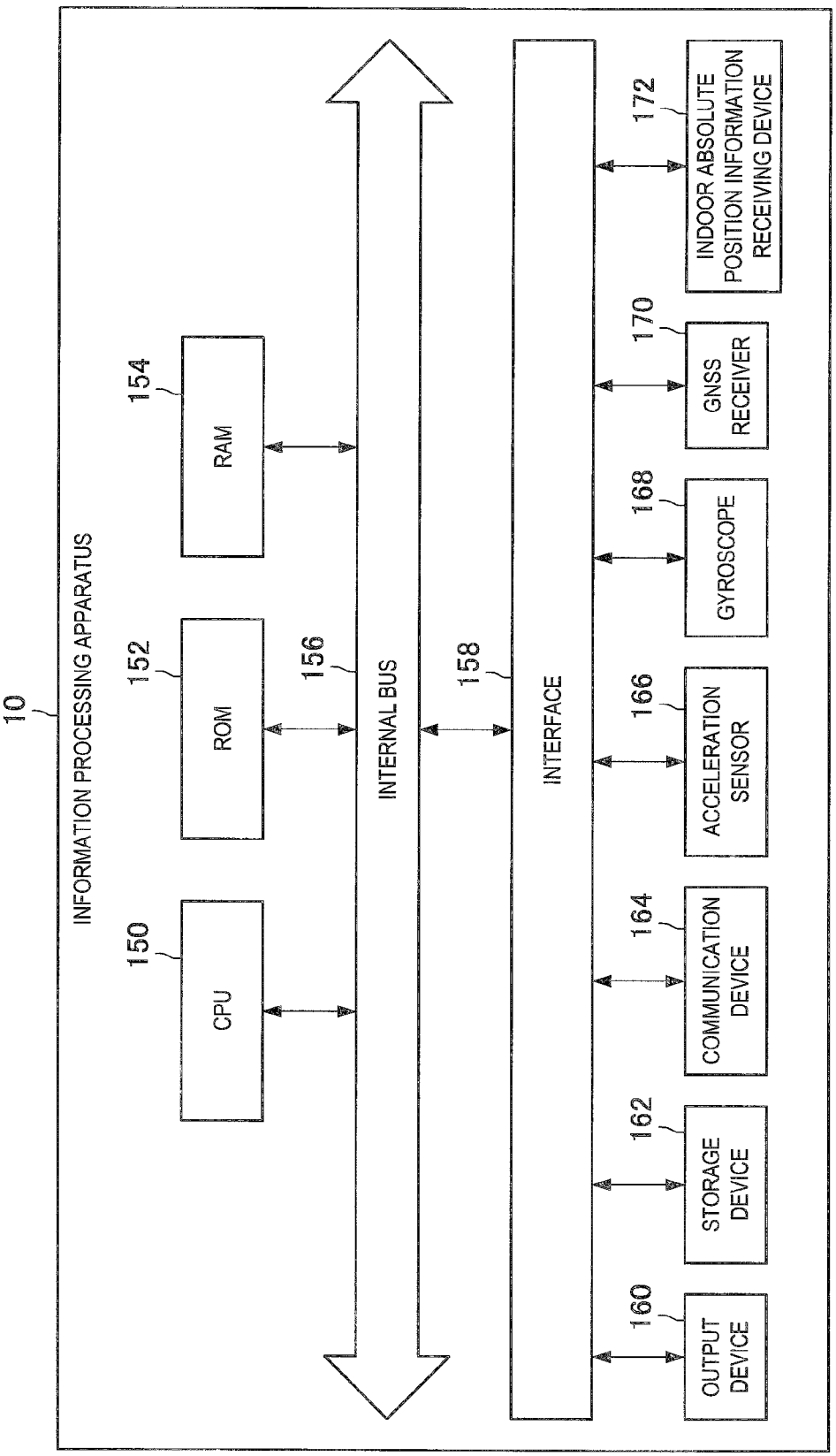
FIG. 2 is an explanatory diagram illustrating a hardware configuration of an information processing apparatus 10 according to each embodiment.

The information processing apparatus 10 has a hardware configuration illustrated in FIG. 2, for example. As illustrated in FIG. 2, the information processing apparatus 10 includes a CPU (Central Processing Unit) 150, a ROM (Read Only Memory) 152, a RAM (Random Access Memory) 154, an internal bus 156, an interface 158, an output device 160, a storage device 162, a communication device 164, an acceleration sensor 166, a gyroscope 168, a GNSS receiver 170, and an indoor absolute position information receiving device 172.

(2-1-1-1. CPU 150)

The CPU 150 functions as an operation processor and a control device, and controls the overall operation in the information processing apparatus 10 in accordance with various types of programs. Also, the CPU 150 realizes the function of a control unit 100 in the information processing apparatus 10. Note that the CPU 150 is configured by a processor such as a microprocessor.

(2-1-1-2. ROM 152)

The ROM 152 stores control data such as programs and operation parameters used by the CPU 150.

(2-1-1-3. RAM 154)

The RAM 154 temporarily stores programs executed by the CPU 150, for example.

(2-1-1-4. Interface 158)

The interface 158 connects the output device 160, the storage device 162, the communication device 164, the acceleration sensor 166, the gyroscope 168, the GNSS receiver 170, and the indoor absolute position information receiving device 172, to the internal bus 156. For example, the output device 160 exchanges data with the CPU 150 and others, via the interface 158 and the internal bus 156.

(2-1-1-5. Output Device 160)

The output device 160 includes a display device, such as for example a liquid crystal display (LCD) device, an organic light emitting diode (OLED) device and a lamp. The display device displays an image generated by the CPU 150. Further, the output device 160 includes a sound output device such as a speaker. The sound output device transforms sound data into sound, and outputs the sound.

(2-1-1-6. Storage Device 162)

The storage device 162 is a device for storing data, which functions as a storage unit 130 described later. The storage device 162 includes, for example, a storage medium, a recording device that records data on the storage medium, a reading device that reads out data from the storage medium, a deleting device that deletes data recorded on the storage medium, etc.

(2-1-1-7. Communication Device 164)

The communication device 164 is, for example, a communication interface configured by a communication device for connecting to a communication network such as a public network and the Internet. Also, the communication device 164 may be a wire communication device that executes communication with a wireless LAN compatible communication device, a LTE (Long Term Evolution) compatible communication device, or through a wire.

(2-1-1-8. Acceleration Sensor 166)

The acceleration sensor 166 measures the acceleration of the information processing apparatus 10. The acceleration sensor 166 functions as a measurement unit 120 described later.

(2-1-1-9. Gyroscope 168)

The gyroscope 168 measures the angular velocity of the information processing apparatus 10. The gyroscope 168 functions as the measurement unit 120 described later.

(2-1-1-10. GNSS Receiver 170)

The GNSS receiver 170 receives a positioning signal from a positioning satellite such as for example GPS (Global Positioning System), GLONASS (Global Navigation Satellite System), Galileo, BeiDou, and Michibiki, and measures the current position. Note that the GNSS receiver 170 may be capable of receiving the positioning signal from one type of satellite, or may be capable of receiving the positioning signals from a plurality of types of satellites to combine the received signals and execute positioning. The GNSS receiver 170 functions as a transmitter information receiving unit 122 described later.

(2-1-1-11. Indoor Absolute Position Information Receiving Device 172)

The indoor absolute position information receiving device 172 has a function to receive a transmitter ID, from a Bluetooth access point, a Wi-Fi access point, or a RFID tag, and the like, for example. The indoor absolute position information receiving device 172 functions as the transmitter information receiving unit 122 described later. Note that the hardware configuration of the information processing apparatus 10 is not limited to the configuration described above. For example, the information processing apparatus 10 does not necessarily include the communication device 164.

<2-2. Transmitter 20>

The transmitter 20 conveys the information of the transmitter by radio waves to the surrounding area. Here, the information of the transmitter is the position information of the position at which the transmitter 20 is located, such as for example the latitude and the longitude, the transmitter ID, or the like. Although the transmitter 20 is basically supposed to be located indoor, the transmitter 20 may be located outdoor.

<<3. DETAILED DESCRIPTION OF EMBODIMENT>>

In the above, description has been made of the basic configuration of the information processing system which is common in each embodiment. Subsequently, each embodiment will be described in detail.

<3-1. First Embodiment>

[3-1-1. Configuration of Information Processing Apparatus 10]

Figure 3:
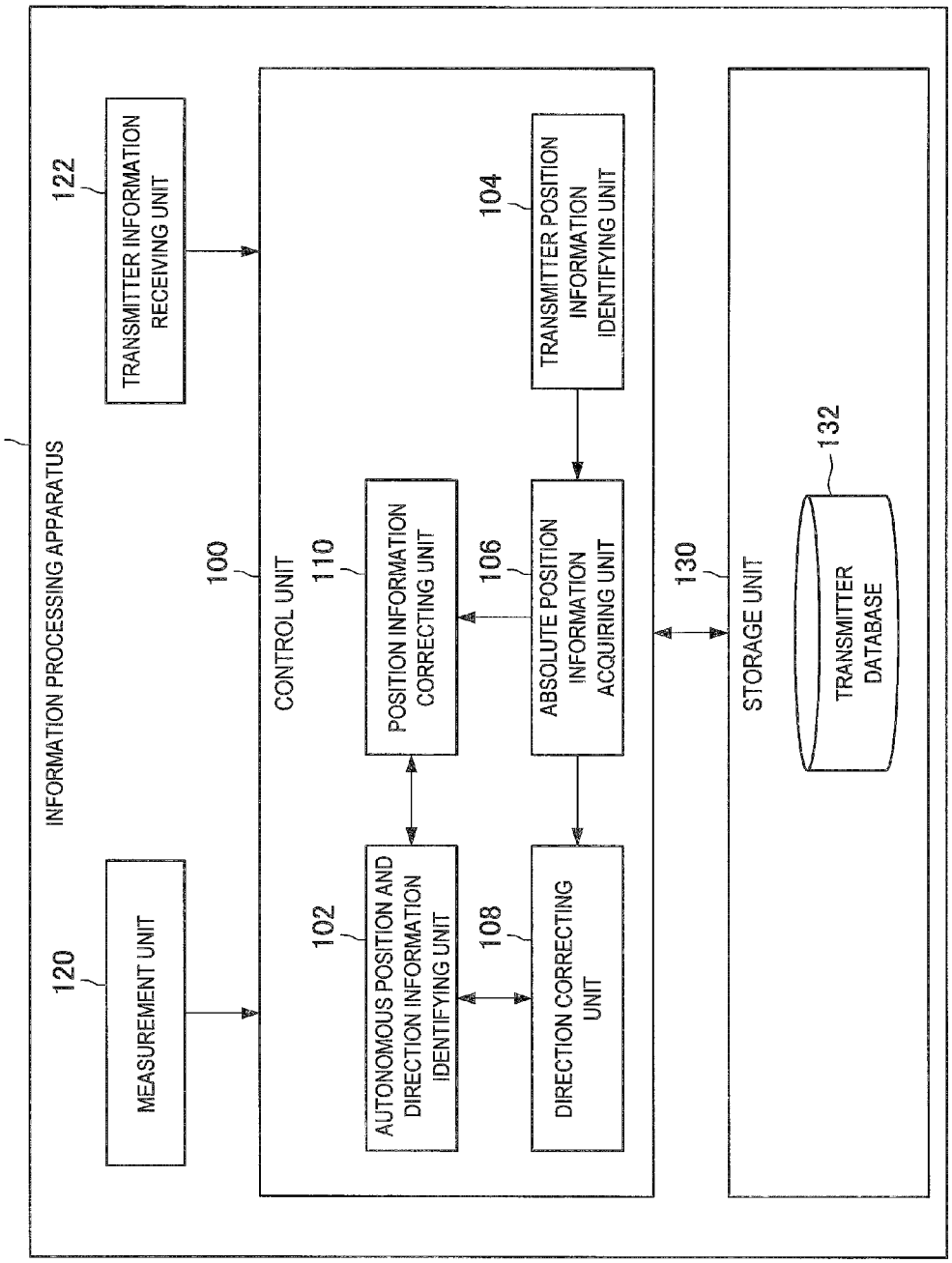
FIG. 3 is a functional block diagram illustrating a configuration of an information processing apparatus 10 according to a first embodiment of the present disclosure.

First, detailed description will be made of the configuration of the information processing apparatus 10 according to the first embodiment. FIG. 3 is a functional block diagram illustrating the configuration of the information processing apparatus 10 according to the first embodiment. As illustrated in FIG. 3, the information processing apparatus 10 has a control unit 100, a measurement unit 120, and a transmitter information receiving unit 122.

(3-1-1-1. Control Unit 100)

The control unit 100 controls the overall operation of the information processing apparatus 10, using hardware such as the CPU 150 and the RAM 154 inside the information processing apparatus 10. Also, as illustrated in FIG. 3, the control unit 100 has an autonomous position and direction information identifying unit 102, a transmitter position information identifying unit 104, an absolute position information acquiring unit 106, a direction correcting unit 108, and a position information correcting unit 110.

(3-1-1-2. Autonomous Position and Direction Information Identifying Unit 102)

The autonomous position and direction information identifying unit 102 is an example of a provisional position and direction information acquiring unit and a relative position and direction information identifying unit in an embodiment of the present disclosure. The autonomous position and direction information identifying unit 102 identifies the autonomous position information and the autonomous direction information of the information processing apparatus 10 on the basis of the measurement result by the measurement unit 120 described later. Here, the autonomous position information is an example of the provisional position information in an embodiment of the present disclosure, and the autonomous direction information is an example of the provisional direction information in an embodiment of the present disclosure.

More specifically, the autonomous position and direction information identifying unit 102 is capable of identifying the relative position information and the relative direction information on the basis of the measurement result of the movement of the information processing apparatus 10 which is measured by the measurement unit 120 in relation to the absolute position information acquired by the absolute position information acquiring unit 106 described later.

Figure 4:
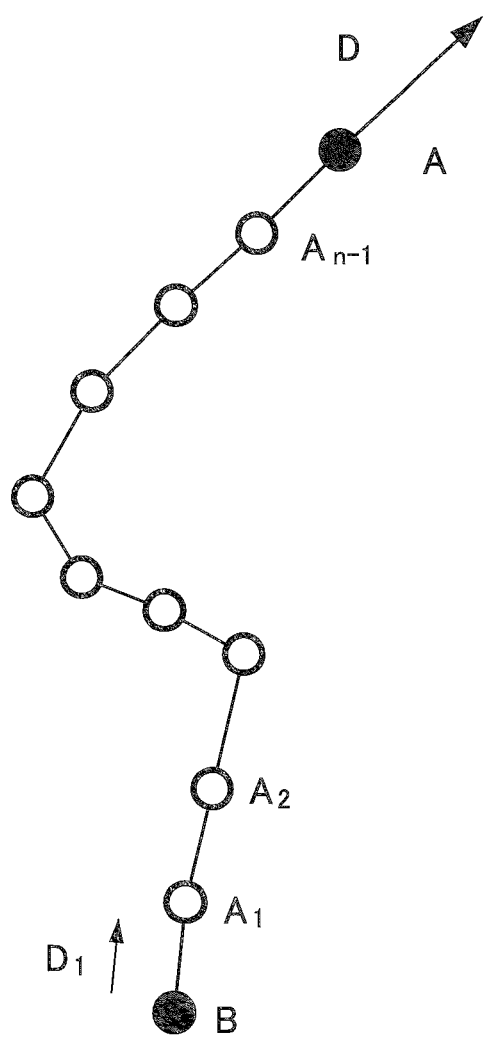
FIG. 4 is an explanatory diagram illustrating an example of an identification of autonomous position information by an autonomous position and direction information identifying unit 102 according to the first embodiment.

Here, with reference to FIG. 4, the above function will be described in more detail. FIG. 4 is an explanatory diagram illustrating an example of the identification of the autonomous position information and the autonomous direction information by the autonomous position and direction information identifying unit 102. Note that, the initial position B illustrated in FIG. 4 is the position corresponding to the position information acquired by the absolute position information acquiring unit 106 described later. Also, the initial direction $D_1$ is the direction corresponding to a predetermined direction information which is set in advance for example.

As illustrated in FIG. 4, for example, the autonomous position and direction information identifying unit 102 identifies the autonomous position information at a predetermined time interval, in the order of the autonomous positions $A_1$, $A_2$, . . . , on the basis of the measurement result of the movement of the information processing apparatus 10, as the relative position information from the position information of the initial position B. Also, as illustrated with the autonomous direction D, the autonomous position and direction information identifying unit 102 identifies the autonomous direction information at each autonomous position, as the relative direction information from the direction information of the initial direction $D_1$.

Note that, as for the identification of the autonomous position information and the autonomous direction information, the autonomous position and direction information identifying unit 102 identifies them by the following method, for example. First, the autonomous position and direction information identifying unit 102 counts the number of steps of the person carrying the information processing apparatus 10 on the basis of the vibration in the vertical direction of the information processing apparatus 10 which is measured by the acceleration sensor 166, and multiplies the number of steps by a predetermined stride length data, to calculate the travel distance from the initial position. Also, the autonomous position and direction information identifying unit 102 calculates the relative travel direction from the initial direction, on the basis of the angular velocity detected by the gyroscope 168. Then, the autonomous position and direction information identifying unit 102 identifies the autonomous position information and the autonomous direction information, on the basis of the position information of the initial position, the calculated travel distance, and the travel direction.

(3-1-1-3. Transmitter Position Information Identifying Unit 104)

The transmitter position information identifying unit 104 identifies the position information of the transmitter 20, on the basis of the information of the transmitter which is received by the transmitter information receiving unit 122 described later from the transmitter 20. More specifically, the transmitter position information identifying unit 104 is capable of identifying the position information such as for example the latitude and the longitude received from the transmitter 20, as the position information of the transmitter 20.

Also, when receiving the transmitter ID from the transmitter 20, the transmitter position information identifying unit 104 refers to the transmitter database 132 described later, to identify the position information corresponding to the received transmitter ID as the position information of the transmitter 20.

Note that the transmitter database 132 is an example of the database in an embodiment of the present disclosure. Here, with reference to FIG. 5, description will be made of an exemplary configuration of the transmitter database 132. As illustrated in FIG. 5, for example, the transmitter ID 1320, the latitude 1322, and the longitude 1324 are recorded in association with each other in the transmitter database 132. For example, the first record in FIG. 5 indicates that the transmitter 20 having the transmitter ID of "ABC001" is located at the position of the latitude "35.690" and the longitude "139.694".

(3-1-1-4. Absolute Position Information Acquiring Unit 106)

The absolute position information acquiring unit 106 is an example of the position information acquiring unit in an embodiment of the present disclosure. The absolute position information acquiring unit 106 acquires the position information of the transmitter 20 identified by the transmitter position information identifying unit 104, as the absolute position information of the information processing apparatus 10.

Also, the absolute position information acquiring unit 106 is capable of not acquiring the absolute position information of the information processing apparatus 10, while the information of the transmitter is not being received by the transmitter information receiving unit 122 from the transmitter 20.

(3-1-1-5. Direction Correcting Unit 108)

The direction correcting unit 108 calculates the direction correction amount for correcting the autonomous direction information, on the basis of the angle formed by the straight line linking the autonomous position information identified by the autonomous position and direction information identifying unit 102 and the last absolute position information which is the position information acquired at the last time by the absolute position information acquiring unit 106, and the straight line linking the present absolute position information which is the position information acquired at this time by the absolute position information acquiring unit 106 and the last absolute position. Here, the last absolute position information is an example of the first position information in an embodiment of the present disclosure, and the present absolute position information is an example of the second position information in an embodiment of the present disclosure.

Figure 6:
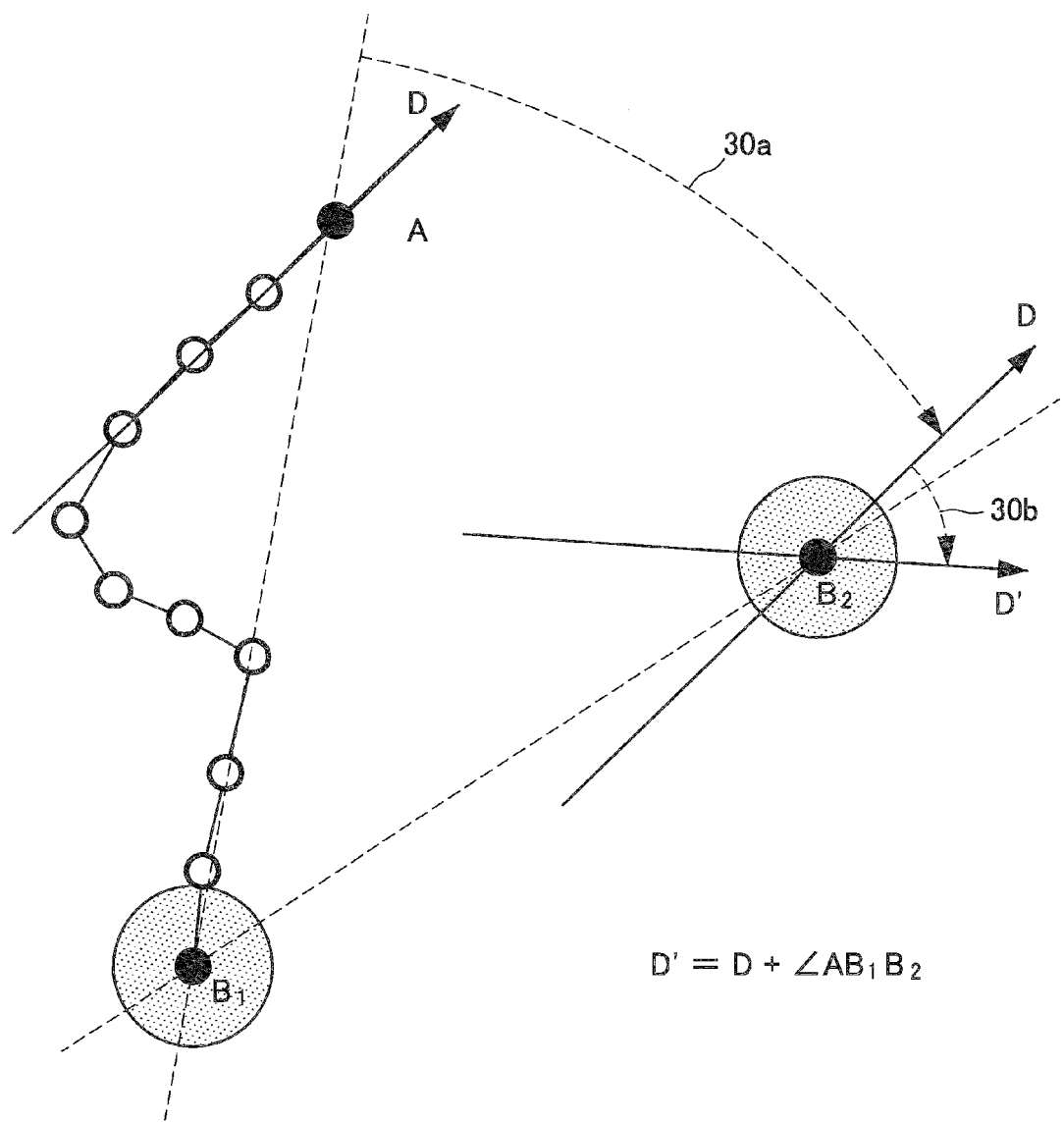
FIG. 6 is an explanatory diagram illustrating an example of a correction of autonomous direction information by a direction correcting unit 108 according to the first embodiment.

Here, with reference to FIG. 6, the above function will be described in more detail. FIG. 6 is an explanatory diagram illustrating a calculation example of the direction correction amount by the direction correcting unit 108. Note that, in FIG. 6, the point $B_1$ represents the last absolute position, and the point $B_2$ represents the present absolute position, and the point A represents the autonomous position, and the arrow D represents the autonomous direction in the point A.

First, the direction correcting unit 108 calculates the angle depicted as the direction error 30a in FIG. 6, that is, the measure of $<AB_1B_2$ which is the angle formed by the straight line linking the position information of the autonomous position A and the position information of the last absolute position $B_1$, and the straight line linking the position information of the present absolute position $B_2$ and the position information of the last absolute position $B_1$. The direction error 30a corresponds to the error of the autonomous direction D due to the deviation of the initial direction at the point $B_1$. Accordingly, the direction correcting unit 108 uses the calculated $<AB_1B_2$, as the direction correction amount for correcting the direction information of the autonomous direction D. Further, the direction correcting unit 108 corrects the direction information of the autonomous direction D to the direction information of the direction D', by the following formula (1).

$$D'=D+<AB_1B_2 \quad \text{Formula (1)}$$

(3-1-1-6. Position Information Correcting Unit 110)

The position information correcting unit 110 corrects the autonomous position information identified by the autonomous position and direction information identifying unit 102, on the basis of the present absolute position information acquired by the absolute position information acquiring unit 106.

Figure 7:
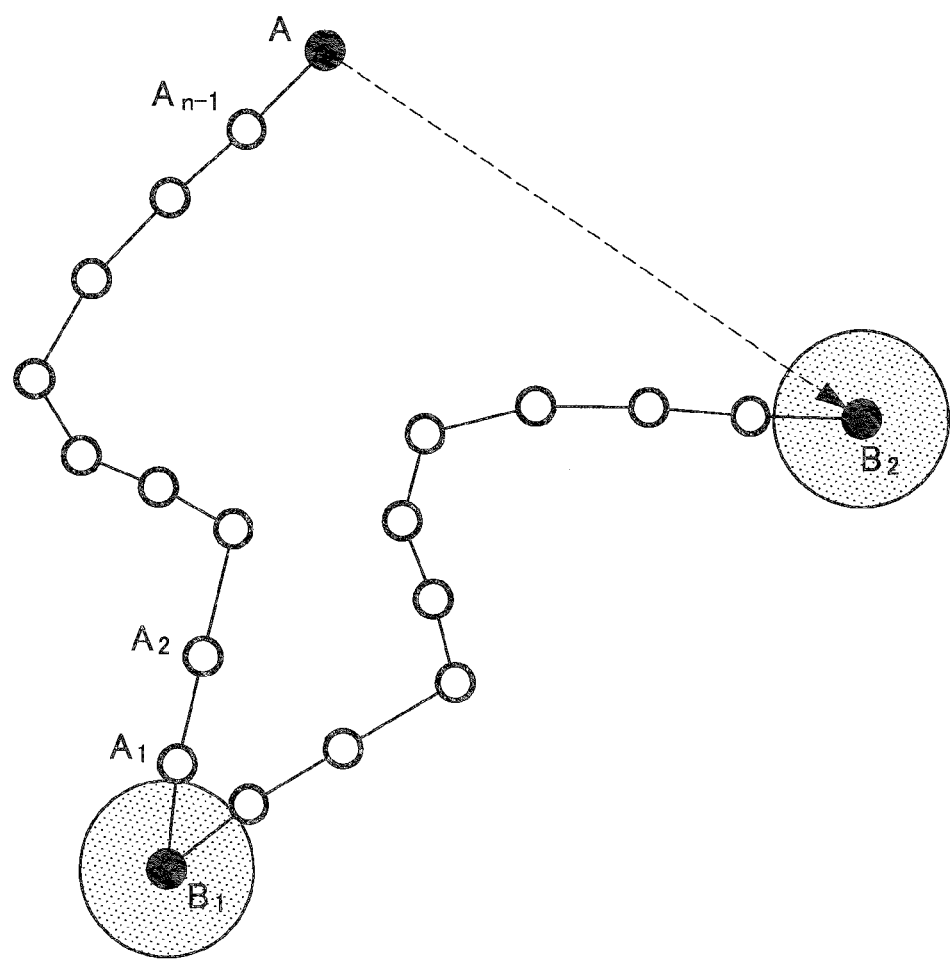
FIG. 7 is an explanatory diagram illustrating an example of a correction of autonomous position information by a position information correcting unit 110 according to the first embodiment.

Here, with reference to FIG. 7, the above function will be described in more detail. FIG. 7 is an explanatory diagram illustrating an example of the correction of the autonomous position information by the position information correcting unit 110. Note that, in FIG. 7, the point A represents the autonomous position, and the point $B_2$ represents the present absolute position.

As illustrated with the arrow of the dashed line in FIG. 7, for example, the position information correcting unit 110 corrects the position information of the autonomous position A to the position information of the present absolute position $B_2$.

(3-1-1-7. Measurement Unit 120)

The measurement unit 120 is configured by the acceleration sensor 166 and the gyroscope 168, for example. The measurement unit 120 measures changes in acceleration, angular velocity, etc of the information processing apparatus 10, for example.

(3-1-1-8. Transmitter Information Receiving Unit 122)

The transmitter information receiving unit 122 is an example of the receiver unit in an embodiment of the present disclosure. The transmitter information receiving unit 122 receives the information of the transmitter from the transmitter 20.

(3-1-1-9. Storage Unit 130)

The storage unit 130 stores various types of data, such as for example the transmitter database 132.

Note that the configuration of the information processing apparatus 10 according to the first embodiment is not limited to the configuration described above. For example, the information processing apparatus 10 may further include a communication unit for communicating with other devices. Also, the transmitter database 132 may be such that the transmitter database 132 is not included in the information processing apparatus 10, but is included in another device capable of communicating with the information processing apparatus 10.

[3-1-2. Operation]

In the above, description has been made of the configuration according to the first embodiment. Subsequently, description will be made of the operation according to the first embodiment.

Figure 8:
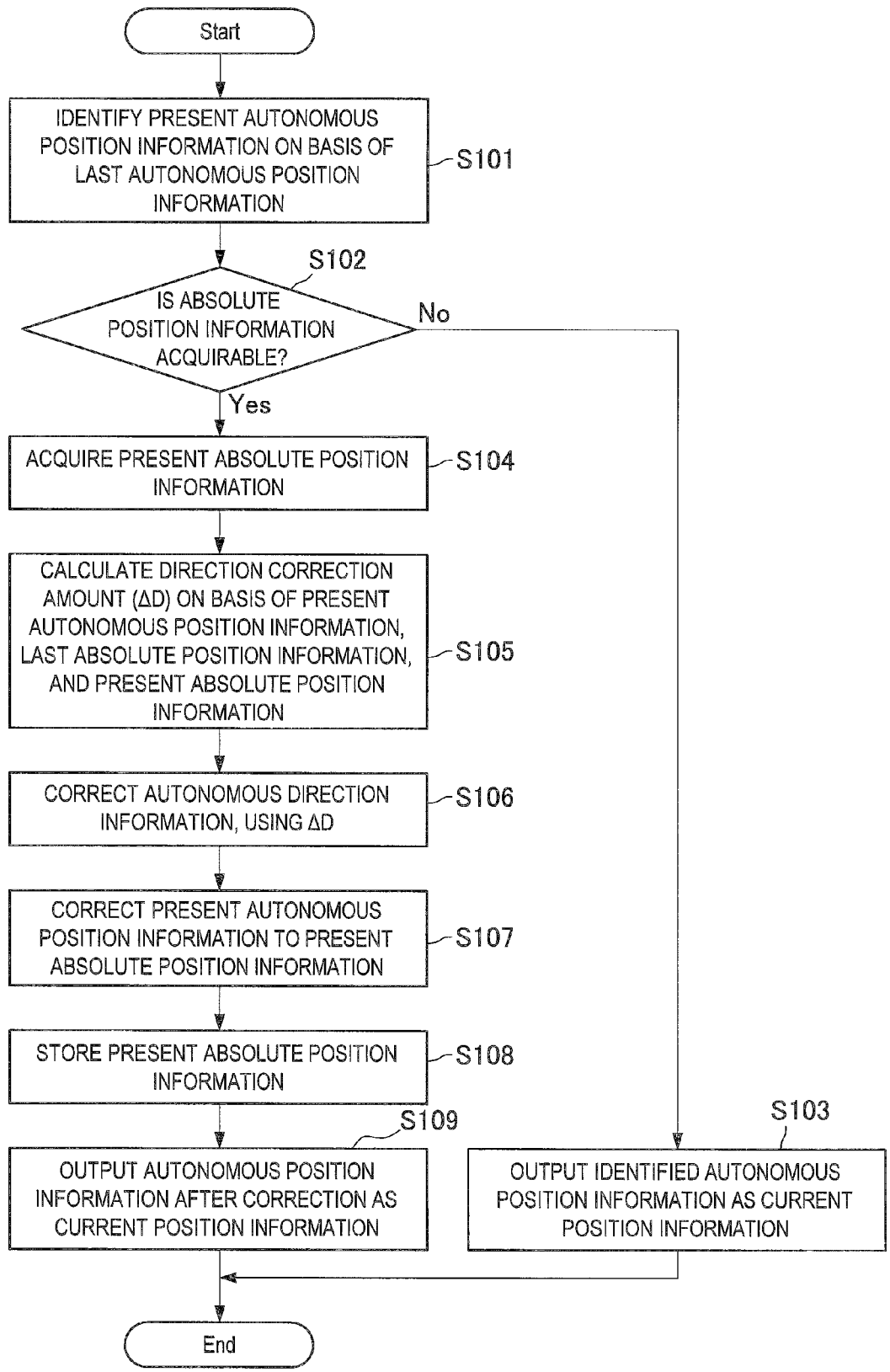
FIG. 8 is a flowchart illustrating an operation according to the first embodiment.

FIG. 8 is a flowchart illustrating the operation according to the first embodiment. As illustrated in FIG. 8, first, the autonomous position and direction information identifying unit 102 of the information processing apparatus 10 identifies the current autonomous position information (hereinafter, referred to as the present autonomous position information) and the current autonomous direction information (hereinafter, referred to as the present autonomous direction information), on the basis of the detection result of the movement of the information processing apparatus 10 by the measurement unit 120 and the autonomous position information identified at the last time (S101).

Subsequently, the control unit 100 confirms whether or not the information of the transmitter is received from the transmitter 20 by the transmitter information receiving unit 122 (S102). If the information of the transmitter is not received (S102: No), the control unit 100 outputs the present autonomous position information identified in S101, to the display screen for example, as the current position information (S103).

On the other hand, if the information of the transmitter is received (S102: Yes), the transmitter position information identifying unit 104 identifies the position information of the transmitter 20, on the basis of the received information of the transmitter. Then, the absolute position information acquiring unit 106 acquires the identified position information of the transmitter 20 as the absolute position information of the information processing apparatus 10 (hereinafter, also referred to as the present absolute position information) (S104).

Subsequently, the direction correcting unit 108 calculates the direction correction amount ($\Delta D$) on the basis of the last absolute position information which is the absolute position information acquired at the last time by the absolute position information acquiring unit 106, the present autonomous position information, and the present absolute position information (S105).

Subsequently, the direction correcting unit 108 corrects the present autonomous direction information, using $\Delta D$ calculated in S105 (S106).

Subsequently, the position information correcting unit 110 corrects the present autonomous position information calculated in S101, to the present absolute position information (S107).

Subsequently, the absolute position information acquiring unit 106 stores the present absolute position information in the storage unit 130 (S108).

Thereafter, the control unit 100 outputs the present autonomous position information corrected in S107, to the display screen for example, as the current position information (S109).

[3-1-3. Effect]

As described above with reference to FIG. 3, FIG. 6, FIG. 8 and others for example, when the information processing apparatus 10 according to the first embodiment acquires the absolute position information at this time, the information processing apparatus 10 calculates the direction correction amount for correcting the autonomous direction information on the basis of the angle formed by the straight line linking the present autonomous position information and the last absolute position information and the straight line linking the present absolute position information and the last absolute position information. Hence, when the information processing apparatus 10 acquires the absolute position information at this time, the information processing apparatus 10 corrects the autonomous direction information appropriately in real time.

(3-1-3-1. Simulation Example)

Figure 9:
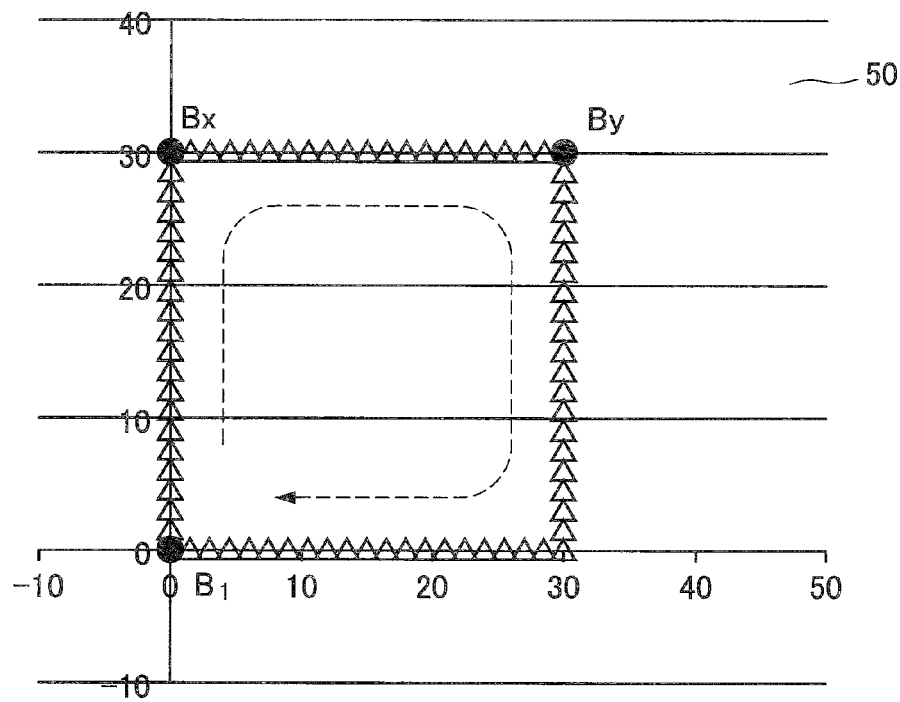
FIG. 9 is an explanatory diagram illustrating an example of a simulation according to the first embodiment.

Here, in order to specifically describe the above effect, description will be made of an example of the simulation according to the first embodiment, with reference to FIGS. 9 to 11. FIG. 9 is a graph 50 illustrating the real traveling trajectory of the information processing apparatus 10. Note that, as illustrated with the arrow of the dashed line, FIG. 9 illustrates an example in which the information processing apparatus 10 travels in the clockwise direction from the starting point at the origin (0, 0).

Figure 10:
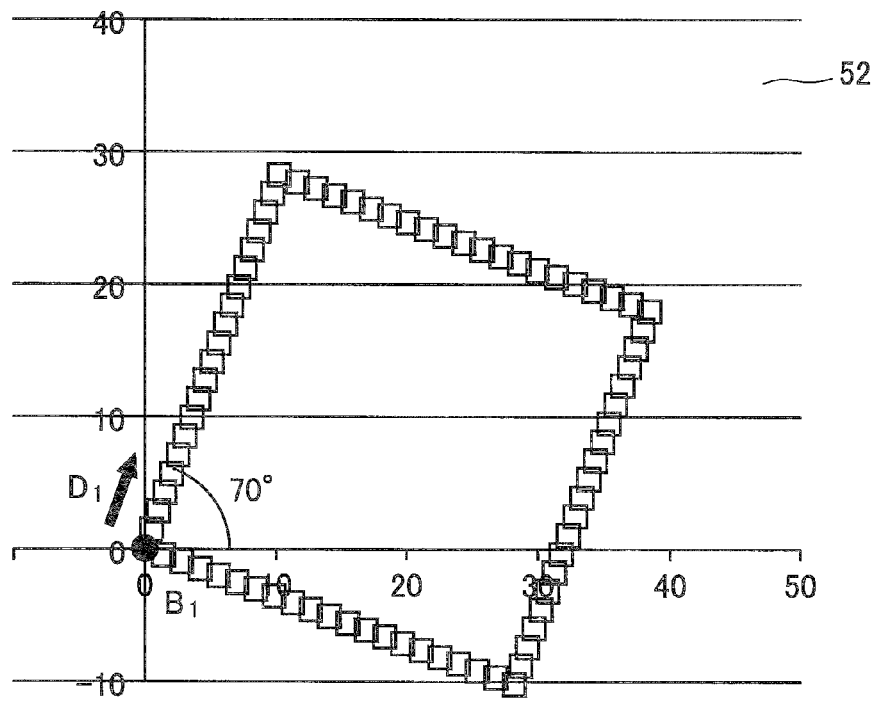
FIG. 10 is an explanatory diagram illustrating an example of a simulation according to the first embodiment.

Also, FIG. 10 is the graph 52 illustrating the point sequence of the autonomous position information identified by the autonomous position and direction information identifying unit 102, in which the relative traveling distance and travel direction from the immediately preceding position information with respect to each point are treated in the same way as the real traveling trajectory illustrated in FIG. 9. Note that FIG. 10 illustrates the identification example of the autonomous position information, where the origin (0, 0) is set as the starting point and $D_1$ is set as the initial direction.

Figure 11:
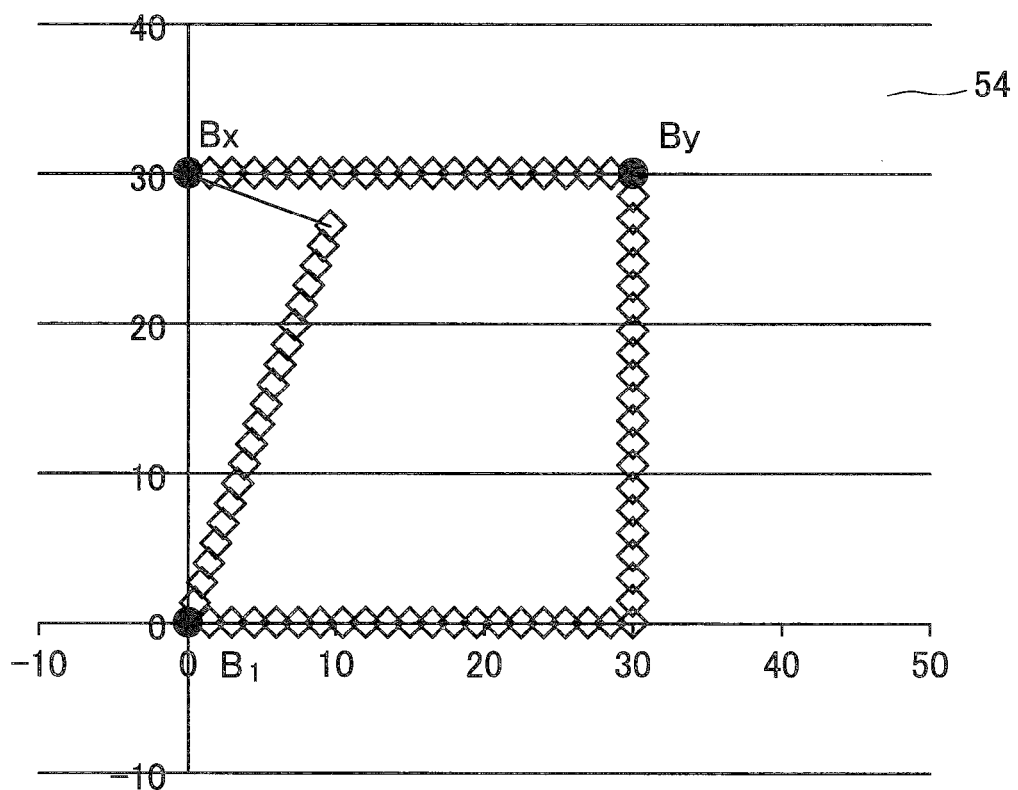
FIG. 11 is an explanatory diagram illustrating an example of a simulation according to the first embodiment.

Also, FIG. 11 is the graph 54 illustrating the point sequence of the position information, when the autonomous position information is identified in the same way as FIG. 10, and the autonomous position information and the autonomous direction information are corrected at the absolute position $B_x$ and the absolute position $B_y$ illustrated in FIG. 9. As illustrated in FIG. 11, the graph 54 has a difference from the graph 50 in the zone $[B_1, B_x]$, and has the same trajectory as the graph 50 in the zone after corrected at the position $B_x$, such as for example the zone $[B_x, B_y]$. Like this, according to the first embodiment, when the absolute position information is acquired, the autonomous position information and the autonomous direction information are corrected in real time in such a manner aligned to the real position information and the real direction information.

(3-1-3-2. Effect 2)

Also, the information processing apparatus 10 appropriately corrects the autonomous position information and the autonomous direction information at a location where the positioning using GPS is difficult, such as for example indoor. This realizes the technology that appropriately guides the user to the destination in a continuous manner within doors, like a navigation system.

(3-1-3-3. Effect 3)

Also, since the autonomous position information and the autonomous direction information are corrected highly accurately within doors, the position information after the correction can be continuously stored and utilized as the life log of the user.

(3-1-3-4. Effect 4)

Also, in the past, the database of the indoor position information has been desired to be created, but has not been created because of the reasons such as, for example, the presence of a region in which the positioning using GPS is difficult, as well as the low accuracy of the positioning by the autonomous positioning alone. According to the first embodiment, because the autonomous position information is corrected highly accurately within doors, the database of the indoor position information can be compiled by having the user carrying the information processing apparatus 10 walk indoor.

<3-2. Second Embodiment>

In the above, the first embodiment has been described. Subsequently, the second embodiment will be described. As described above, in the first embodiment, the information processing apparatus 10 acquires the position information of the position at which the transmitter 20 is located, as the current position information, in the receivable range of the information of the transmitter from the transmitter 20, in order to calculate the direction correction amount. When the real position information of the information processing apparatus 10 and the position information of the transmitter 20 are away from each other, the direction correction amount is supposed to include an error. Specifically, when the distance between the adjacent transmitters 20 is short, the error is relatively large. As described later, according to the second embodiment, even when the distance between the transmitters 20 is short, the direction correction amount is calculated in such a manner to make the error included in the direction correction amount smaller.

[3-2-1. Configuration of Information Processing Apparatus 10]

The components of the information processing apparatus 10 according to the second embodiment are same as the components in the first embodiment. In the following, only components having a different function from the first embodiment will be described.

(3-2-1-1. Direction Correcting Unit 108)

The direction correcting unit 108 according to the second embodiment calculates the direction correction amount by adjusting the angle formed by the straight line linking the autonomous position information at the time of the acquisition of the present absolute position information and the last absolute position information and the straight line linking the present absolute position information and the last absolute position information (hereinafter, also referred to as the observed direction error angle), on the basis of the distance between the present absolute position information and the last absolute position information.

More specifically, the direction correcting unit 108 multiplies the observed direction error angle by a value according to the distance between the last absolute position information and the present absolute position information, in order to calculate the direction correction amount.

Figure 12:
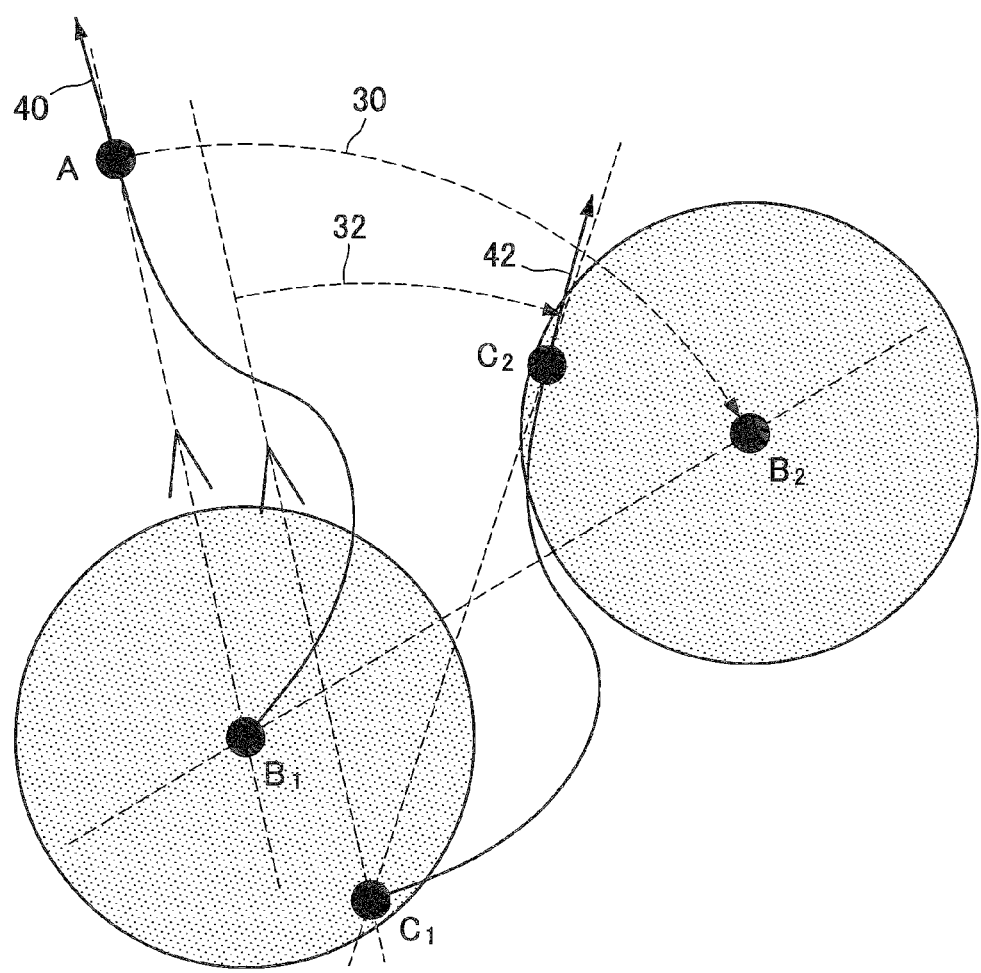
FIG. 12 is an explanatory diagram illustrating an example of a correction of autonomous direction information by a direction correcting unit 108 according to a second embodiment of the present disclosure.

Here, with reference to FIG. 12, the above function will be described in more detail. In FIG. 12, $B_1$ represents the position of the transmitter 20 at the time of the acquisition of the last absolute position information, and $B_2$ represents the position of the transmitter 20 at the time of the acquisition of the present absolute position information. Also, $C_1$ represents the real position of the information processing apparatus 10 at the time of the acquisition of the last absolute position information, and $C_2$ represents the real position of the information processing apparatus 10 at the time of the acquisition of the present absolute position information. Also, the arrow 40 is the trajectory of the autonomous position information identified by the autonomous position and direction information identifying unit 102, and the arrow 42 represents the real traveling trajectory of the information processing apparatus 10.

In an example illustrated in FIG. 12, at the time of the last acquisition the information processing apparatus 10 is positioned at $C_1$, that is, within the receivable range of the transmitter 20 positioned at $B_1$, and therefore the absolute position information acquiring unit 106 acquires the last absolute position information as the position information of $B_1$. In the same way, at the time of the present acquisition, the information processing apparatus 10 is positioned at $C_2$, that is, within the receivable range of the transmitter 20 positioned at $B_2$, and therefore the absolute position measuring unit 106 acquires the present absolute position information as the position information of $B_2$. Hence, the direction correcting unit 108 calculates <$AB_1B_2$ as the observed direction error angle 30.

In the meantime, the real position at the time of the last acquisition is $C_1$ and the real position at the time of the present acquisition is $C_2$, and therefore the real direction error angle is the angle 32, to be exact. Like this, the observed direction error angle 30 includes an error in relation to the real direction error angle 32.

Figure 13:
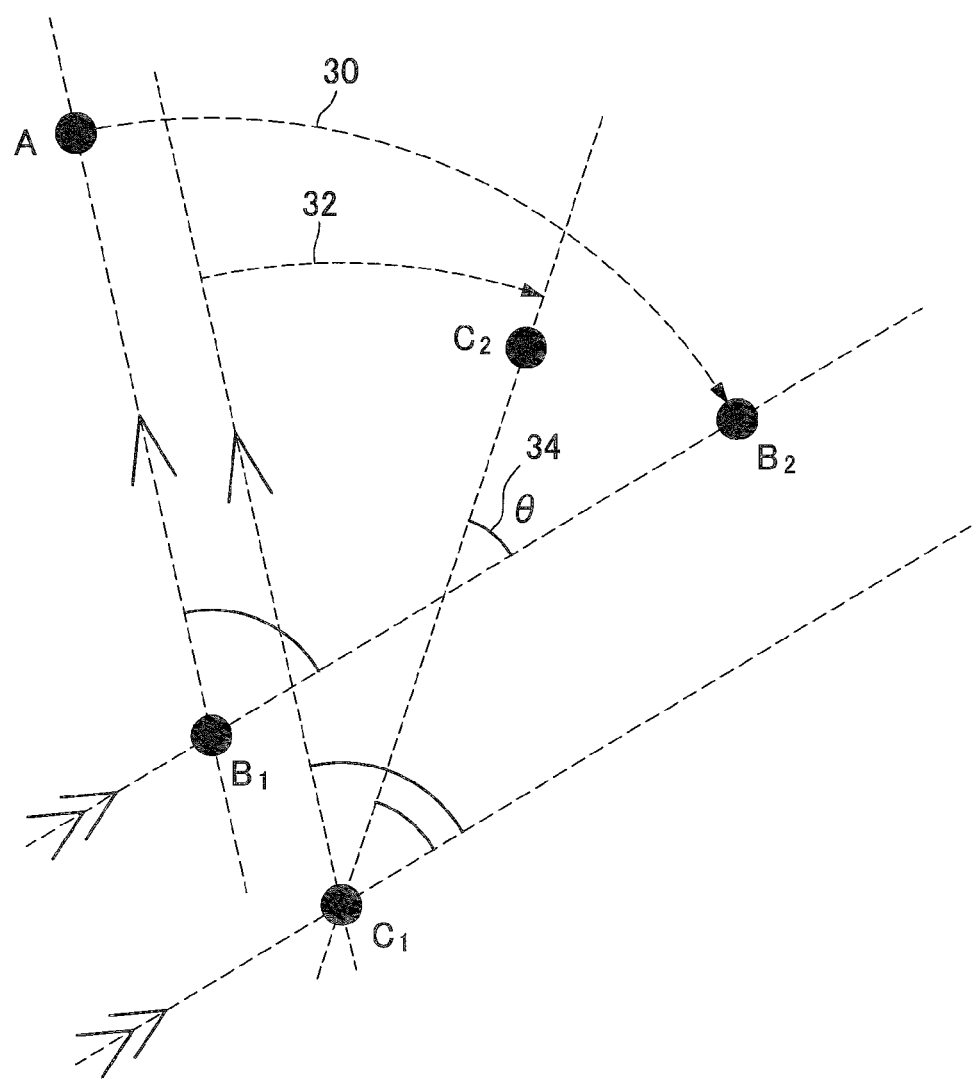
FIG. 13 is an explanatory diagram illustrating an example of a correction of autonomous direction information by a direction correcting unit 108 according to the second embodiment.

Here, with reference to FIG. 13, the above subject will be described in more detail. FIG. 13 is an explanatory diagram that further simplifies FIG. 12. As illustrated in FIG. 13, the observed direction error angle 30 includes an error of angle θ in relation to the real direction error angle 32.

Figure 14:
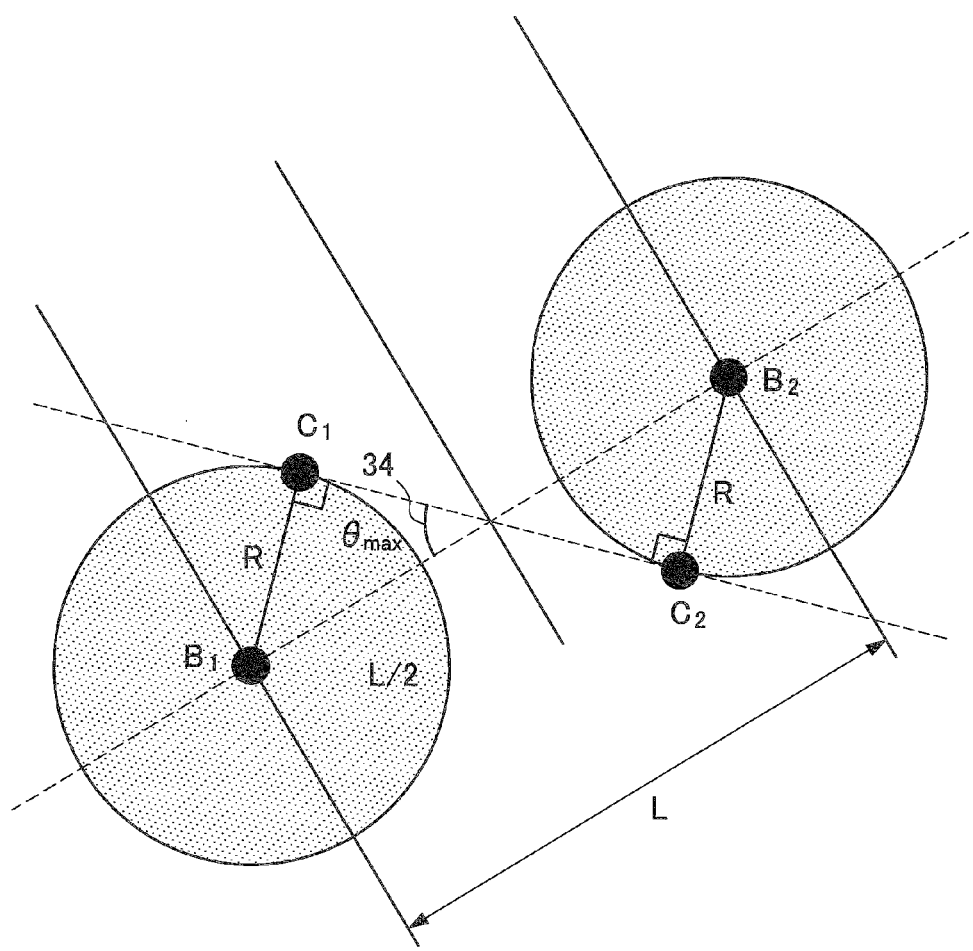
FIG. 14 is an explanatory diagram illustrating the maximum amount of an error of a correction of autonomous direction information by a direction correcting unit 108 according to the second embodiment.

Here, with reference to FIG. 14, description will be further made of the situation in which the error 34 of the observed direction error angle is at the maximum. FIG. 14 is an explanatory diagram illustrating the situation in which the error 34 of the observed direction error angle is at the maximum. In FIG. 14, L represents the distance between the adjacent transmitters 20, and R represents the receivable range of each transmitter 20. Note that, to simplify the description, the receivable range of the transmitter 20 positioned at $B_1$ and the receivable range of the transmitter 20 positioned at $B_2$ are same in size, that is, the radii are both R.

As illustrated in FIG. 14, the magnitude of the error 34 of the observed direction error angle is at the maximum, when the real positions $C_1$ and $C_2$ of the information processing apparatus 10 are each positioned on the circle of the receivable range of the transmitter 20. In this case, the magnitude of the error 34 of the observed direction error angle is calculated by the following formula (2).

$$\theta_{max} = \sin^{-1} \frac{2R}{L}$$ Formula (2)

As in the formula (2), the error 34 of the observed direction error angle is a value according to the distance between the transmitters 20. Hence, in order to suppress the error 34 of the observed direction error angle at or below a certain value, the direction correcting unit 108 multiplies the observed direction error angle by the value according to the distance between the transmitters 20, to calculate the direction correction amount. More specifically, the direction correcting unit 108 calculates the direction correction amount in such a manner to make the direction correction amount smaller as the distance between the transmitters 20 is smaller. For example, the direction correcting unit 108 calculates the direction correction amount by the following calculation formula.

Direction Correction Amount=Observed Direction Error Angle×L/100[m]

Alternatively, the direction correcting unit 108 may adjust the observed direction error angle by the ratio between the distance between the transmitters 20 and the radius of the receivable range of the transmitter 20, to calculate the direction correction amount. For example, the direction correcting unit 108 calculates the direction correction amount by the following calculation formula.

Direction Correction Amount=Observed Direction Error Angle×(1−2×R/L)

Note that, when the distance between the last absolute position information and the present absolute position information is sufficiently large, the difference between the position information of the transmitter 20 and the real position information of the information processing apparatus 10 becomes relatively small to a sufficient degree, and thereby the error of the observed direction error angle is regarded as being extremely small. Hence, as a variant example, the direction correcting unit 108 may calculate the observed direction error angle, as it is, as the direction correction amount, when the distance between the last absolute position information and the present absolute position information is equal to or longer than a predetermined distance.

[3-2-2. Operation]

In the above, description has been made of the configuration according to the second embodiment. Subsequently, description will be made of the operation according to the second embodiment.

Figure 15:
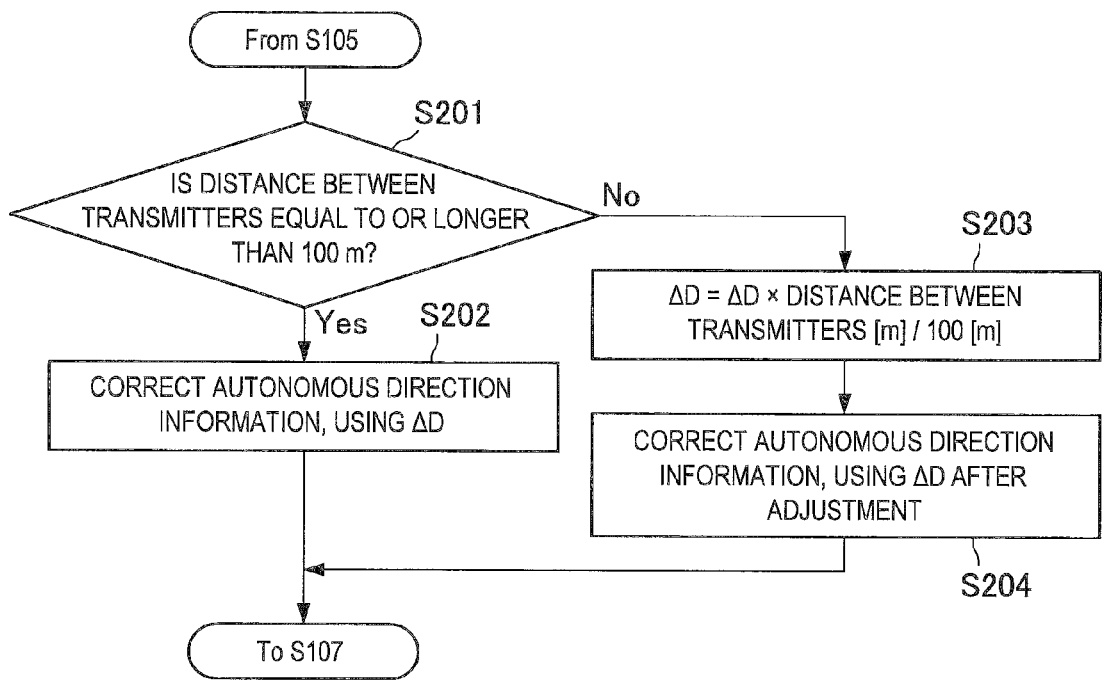
FIG. 15 is a flowchart illustrating a part of an operation according to the second embodiment.

FIG. 15 is a flowchart illustrating the operation according to the second embodiment. Note that the operation from S101 to S105 is same as that in the first embodiment, and therefore the description thereof is omitted in FIG. 15.

As illustrated in FIG. 15, after S105, the direction correcting unit 108 determines whether or not the distance between the transmitters 20, that is the distance between the last absolute position information and the present absolute position information, is equal to or longer than 100 m (S201). If the distance between the transmitters is equal to or longer than 100 m (S201: Yes), the direction correcting unit 108 corrects the present autonomous direction information, using ΔD calculated in S105, that is the observation direction error (S202). Note that the operation after S202 is same as the operation in and after S107 in the first embodiment.

On the other hand, if the distance between the transmitters is shorter than 100 m (S201: No), the direction correcting unit 108 calculates the direction correction amount by the following calculation formula (S203).

Direction Correction Amount=ΔD calculated in S105× Distance between Transmitters [m]/100 [m]

Then, the direction correcting unit 108 corrects the present autonomous direction information, using ΔD calculated in S202 (S204).

Note that the operation after S204 is same as the operation in and after S107 in the first embodiment.

[3-2-3. Effect]

In the above, as described with reference to FIGS. 12 to 15, the information processing apparatus 10 according to the second embodiment multiplies the observed direction error angle by the value according to the distance between the last absolute position information and the present absolute position information, in order to calculate the direction correction amount for correcting the autonomous direction information. For example, the information processing apparatus 10 calculates the direction correction amount in such a manner to make the direction correction amount smaller as the distance between the last absolute position information and the present absolute position information is smaller.

In general, as the distance between the last absolute position information and the present absolute position information becomes smaller, the difference between the position information of the transmitter 20 and the real position information of the information processing apparatus 10 becomes relatively larger, and thereby the error that may be included in the observed direction error angle becomes larger. Hence, the information processing apparatus 10 calculates the direction correction amount in such a manner to make the direction correction amount smaller as the distance between the last absolute position information and the present absolute position information is smaller for example, in order to suppress the error included in the direction correction amount at a small value. Hence, the autonomous direction information is corrected by an adequate amount.

Also, each time the absolute position information is acquired, the information processing apparatus 10 according to the second embodiment calculates the direction correction amount in such a manner that the direction correction amount is equal to or smaller than the observed direction error angle. Hence, by repeating the correction of the direction information, the deviation of the initial direction, which is the cause of the error of the autonomous direction information, is gently resolved. Accordingly, the autonomous direction information is stably corrected as compared with the first embodiment, for example.

<3-3. Third Embodiment>

In the above, the second embodiment has been described. Subsequently, the third embodiment will be described. As described later, according to the third embodiment, when the absolute position information is acquired a plurality of times within a receivable range from the transmitter 20, more appropriate autonomous position information is selected as the autonomous position information corresponding to the absolute position information.

[3-3-1. Configuration of Information Processing Apparatus 10]

The components of the information processing apparatus 10 according to the third embodiment are same as the components in the first embodiment. In the following, only components having a different function from the first embodiment will be described.

(3-3-1-1. Autonomous Position and Direction Information Identifying Unit 102)

When the autonomous position and direction information identifying unit 102 according to the third embodiment identifies a plurality of pieces of autonomous position information while the information of the transmitter is being received from the transmitter 20, the autonomous position and direction information identifying unit 102 selects one of the plurality of pieces of identified autonomous position information as the present autonomous position information.

Figure 16:
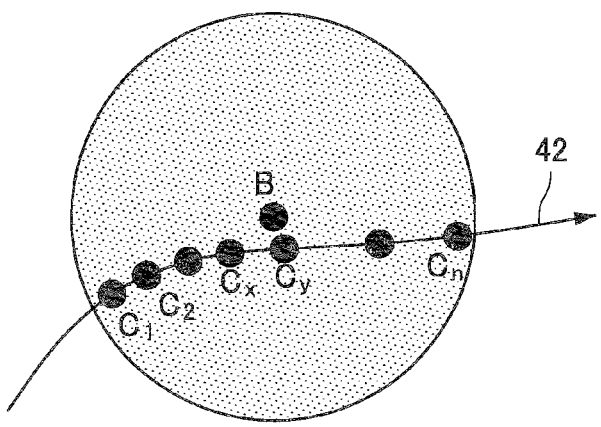
FIG. 16 is an explanatory diagram illustrating an example of an identification of autonomous position information by an autonomous position and direction information identifying unit 102 according to a third embodiment of the present disclosure.

Here, with reference to FIG. 16, the above function will be described in more detail. FIG. 16 is an explanatory diagram illustrating an example in which the plurality of pieces of autonomous position information are identified within the receivable range, when the information processing apparatus 10 travels along the arrow 42. Note that each of $C_1, C_2, \ldots C_n$ represents the autonomous position identified within the receivable range, for example at each predetermined time interval.

For example, the autonomous position and direction information identifying unit 102 selects the autonomous position information identified at the time closest to the average value of the identified times, that is the position corresponding to the center of the identified times, which is for example $C_x$ in FIG. 16, as the present autonomous position information, from among the plurality of pieces of identified autonomous position information. Alternatively, the autonomous position and direction information identifying unit 102 selects the average position information of the plurality of pieces of autonomous position information, that is the position information corresponding to the center in the travel distance of the information processing apparatus 10, which is for example $C_y$ in FIG. 16, as the present autonomous position information, from among the plurality of pieces of identified autonomous position information.

[3-3-2. Operation]

In the above, description has been made of the configuration according to the third embodiment. Subsequently, description will be made of the operation according to the third embodiment.

Figure 17:
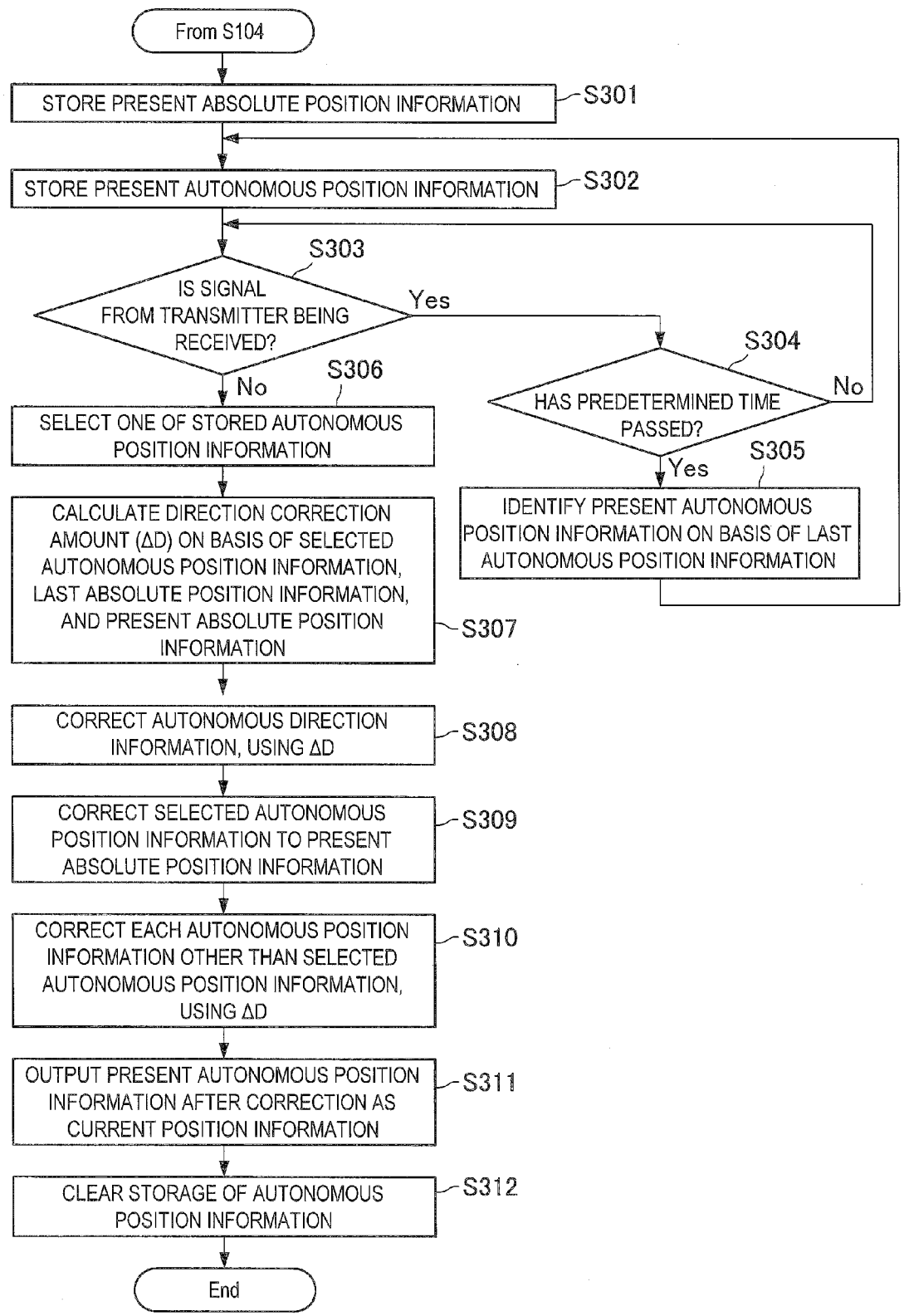
FIG. 17 is a flowchart illustrating a part of an operation according to the third embodiment.

FIG. 17 is a flowchart illustrating the operation according to the third embodiment. Note that the operation from S101 to S104 is same as that in the first embodiment, and therefore the description thereof is omitted in FIG. 17. As illustrated in FIG. 17, after S104, the absolute position information acquiring unit 106 stores the present absolute position information acquired in S104, in the storage unit 130 (S301).

Subsequently, the autonomous position and direction information identifying unit 102 stores the present autonomous position information identified in S101, in the storage unit 130 (S302).

Subsequently, the control unit 100 determines whether or not the signal from the transmitter 20 is being received, that is, whether or not the information processing apparatus 10 stays within the receivable range from the transmitter 20 (S303). If the signal is being received (S303: Yes), the control unit 100 further determines whether or not a predetermined time has passed (S304). If the predetermined time has not passed (S304: No), the control unit 100 repeats the operation of S303.

On the other hand, if the predetermined time has passed (S304: Yes), the autonomous position and direction information identifying unit 102 identifies the current autonomous position information (i.e., the present autonomous position information) and the autonomous direction information (S305), on the basis of the detection result of the movement of the information processing apparatus 10 by the measurement unit 120 and the autonomous position information identified at the last time, in the same way as S101. Thereafter, the autonomous position and direction information identifying unit 102 repeats the operation of S302.

In S303, if the information processing apparatus 10 has not received the signal (S303: No), the autonomous position and direction information identifying unit 102 selects one of one or more of the pieces of autonomous position information stored in the storage unit 130, as the present autonomous position information (S306).

Subsequently, the direction correcting unit 108 calculates the direction correction amount ($\Delta D$) on the basis of the autonomous position information selected in S306, the last absolute position information, and the present absolute position information (S307).

Subsequently, the direction correcting unit 108 corrects the autonomous direction information corresponding to the autonomous position information selected in S306, using $\Delta D$ calculated in S307 (S308).

Subsequently, the position information correcting unit 110 corrects the autonomous position information selected in S306 to the present absolute position information (S309).

Subsequently, the position information correcting unit 110 rotates each autonomous position information other than the autonomous position information selected in S306, by AD, with respect to the center at the last absolute position information, in order to correct the position information (S310).

Subsequently, the control unit 100 outputs the autonomous position information corrected in S309, as the current position information, to the display screen for example (S311). Note that, as a variant example, the control unit 100 may output the position information generated by correcting the last identified autonomous position information in S309 or S310, such as for example $C_n$ illustrated in FIG. 16, as the current position information, to the display screen.

Thereafter, the control unit 100 causes the storage unit 130 to erase the stored autonomous position information (S312).

[3-3-3. Effect]

In the above, as described with reference to FIGS. 16 and 17, when a plurality of autonomous position information has been identified while the information of the transmitter is being received from the transmitter 20, the information processing apparatus 10 according to the third embodiment selects the position information corresponding to the center in the identified time or the travel distance, as the present autonomous position information, from among the plurality of pieces of identified autonomous position information. Hence, when the autonomous position information is acquired a plurality of times within the receivable range from the transmitter 20, more appropriate autonomous position information is selected as the autonomous position information corresponding to the absolute position information, in order to calculate the direction correction amount in such a manner to make the error of the direction correction amount smaller.

<3-4. Fourth Embodiment>

In the above, the third embodiment has been described. Subsequently, the fourth embodiment will be described.

Figure 18:
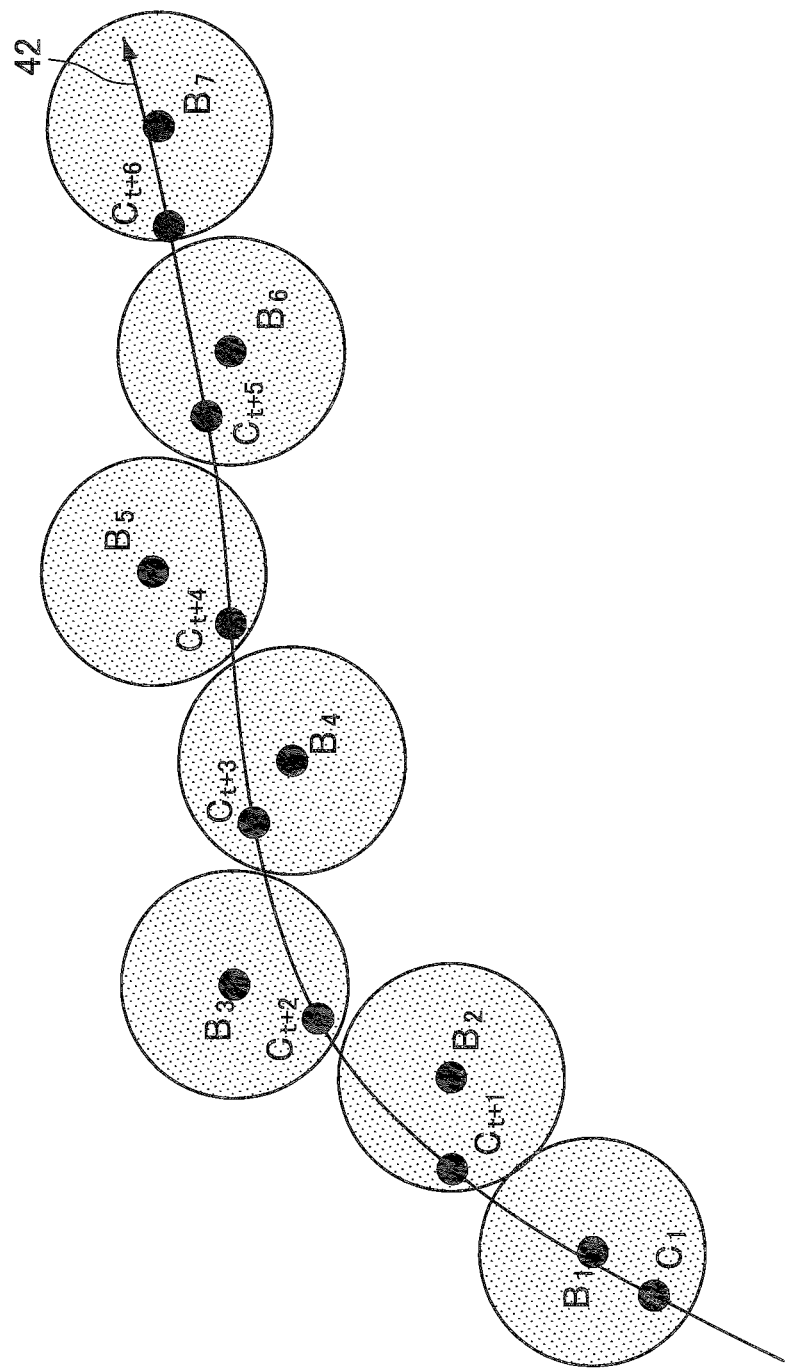
FIG. 18 is an explanatory diagram illustrating an example of an identification of autonomous position information by an autonomous position and direction information identifying unit 102 according to a fourth embodiment of the present disclosure.

First, description will be made of the background that has led the fourth embodiment to be created, with reference to FIG. 18. FIG. 18 is an explanatory diagram illustrating an example in which the information processing apparatus 10 travels through the receivable ranges of a plurality of the transmitters 20 and acquires the position information, in the situation where the adjacent transmitters 20 are located at short intervals. Note that FIG. 18 illustrates an example in which the information processing apparatus 10 is positioned within the receivable range of different transmitter 20 at each time point of identifying the autonomous position information. For example, at the time point of identifying the position information of the autonomous position $C_t$, the information processing apparatus 10 is positioned within the receivable range of the transmitter 20 positioned at $B_1$, and at the time point of identifying the position information of the autonomous position $C_{t+1}$, the information processing apparatus 10 is positioned within the receivable range of the transmitter 20 positioned at $B_2$.

Figure 19:
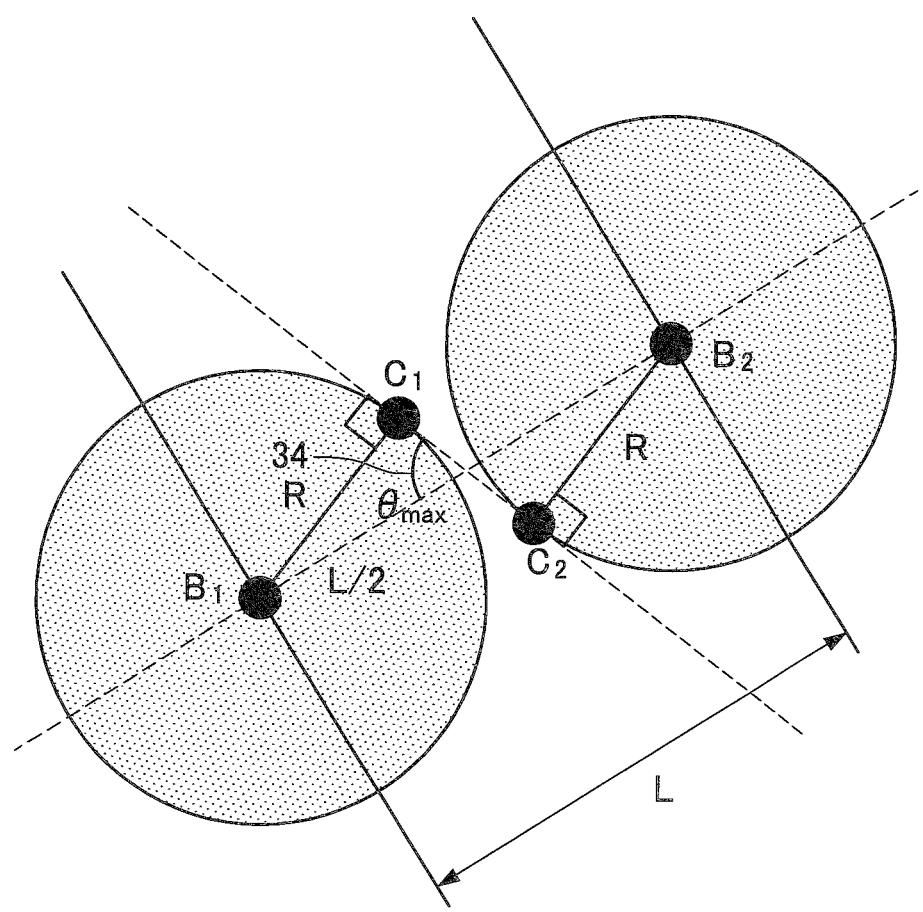
FIG. 19 is an explanatory diagram illustrating an example of a case in which an error increases when correcting autonomous direction information, according to the fourth embodiment.

When the interval of the transmitter 20 is relatively short compared with the extent of the receivable range as illustrated in FIG. 18, the error that may be included in the observed direction error angle is large. With reference to FIG. 19, the above subject will be further described in more detail. FIG. 19 is an exemplary diagram of the case where the error 34 of the observed direction error angle illustrated in FIG. 14 is at the maximum, and the distance (L) between the transmitters 20 is depicted shorter than FIG. 14. As illustrated in FIG. 19, the distance L between the transmitters 20 becomes shorter than L in FIG. 14 when the receivable range is same in size (i.e., R), the error $\theta_{max}$ of the observed direction error angle becomes larger than the error in FIG. 14.

As described later, according to the fourth embodiment, even when the interval of the transmitter 20 is relatively short compared with the extent of the receivable range as illustrated in FIG. 18, the direction correction amount is calculated in such a manner to make the error of the direction correction amount smaller.

[3-4-1. Configuration of Information Processing Apparatus 10]

The components of the information processing apparatus 10 according to the fourth embodiment are same as the components in the first embodiment. In the following, only components having a different function from the first embodiment will be described.

(3-4-1-2. Direction Correcting Unit 108)

If the distance between the last absolute position information and the present absolute position information is shorter than a predetermined distance when the present absolute position information is acquired by the absolute position measuring unit 106, the direction correcting unit 108 according to the fourth embodiment selects the position information that is the predetermined distance or more away from the present absolute position information from among the position information of one or more transmitters 20 identified in advance by the transmitter position information identifying unit 104, and treats the selected position information of the transmitter 20 as the last absolute position information.

In an example illustrated in FIG. 18, when the present absolute position is at $B_4$, the direction correcting unit 108 treats the position information of, for example, $B_1$ that is the predetermined distance or more away from the position information of $B_4$, as the last absolute position information. Also, when the present absolute position is at $B_5$, the direction correcting unit 108 treats the position information of, for example, $B_2$ that is the predetermined distance or more away from the position information of $B_5$, as the last absolute position information.

Note that, as a variant example, the direction correcting unit 108 may treat the position information of the transmitter 20 identified by the transmitter position information identifying unit 104 a predetermined time or more before from the time when the absolute position information is acquired at this time, as the last absolute position information. Alternatively, the direction correcting unit 108 may treat the position information of the transmitter 20 identified by the transmitter position information identifying unit 104 at the time point of the past from which the information processing apparatus 10 has traveled the distance of a predetermined length or more until the information processing apparatus 10 reaches the site where the absolute position information is acquired at this time, as the last absolute position information.

[3-4-2. Operation]

In the above, description has been made of the configuration according to the fourth embodiment. Subsequently, description will be made of the operation according to the fourth embodiment.

Figure 20:
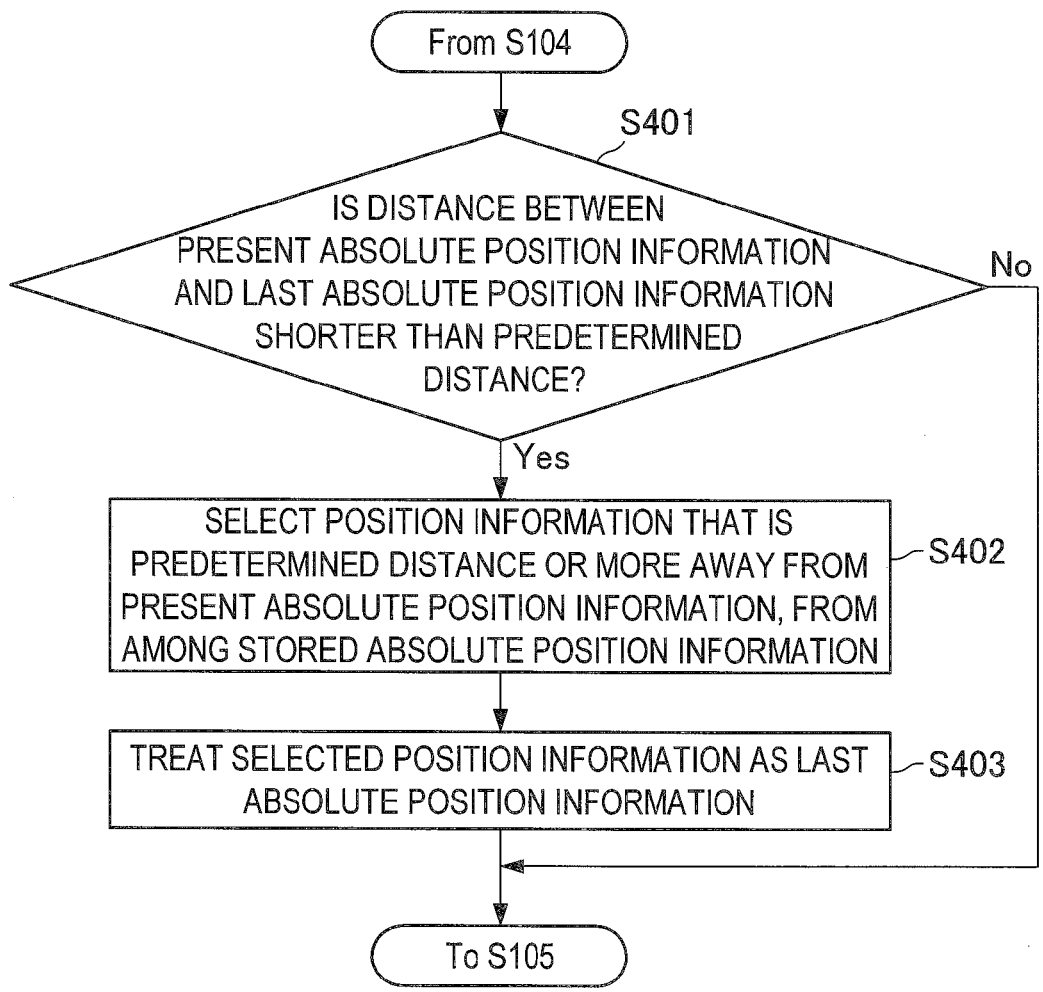
FIG. 20 is a flowchart illustrating a part of an operation according to the fourth embodiment.

FIG. 20 is a flowchart illustrating the operation according to the fourth embodiment. Note that the operation from S101 to S104 is same as that in the first embodiment, and therefore the description thereof is omitted in FIG. 20. As illustrated in FIG. 20, after S104, the direction correcting unit 108 determines whether or not the distance between the present absolute position information acquired in S104 and the last absolute position information is shorter than the predetermined distance (S401). If the distance between the present absolute position and the last absolute position is equal to or longer than the predetermined distance (S401: No), the direction correcting unit 108 executes the operation in and after S105.

On the other hand, if the distance between the present absolute position information and the last absolute position information is shorter than the predetermined distance (S401: Yes), the direction correcting unit 108 selects the position information that is the predetermined distance or more away from the present absolute position information, from among the absolute position information acquired in advance and stored in the storage unit 130 (S402). Then, the direction correcting unit 108 treats the selected absolute position information as the last absolute position information (S403).

Note that the subsequent operation is same as the operation in and after S105 in the first embodiment.

[3-4-3. Effect]

In the above, as described with reference to FIGS. 18 to 20, if the distance between the present absolute position information and the last absolute position information is shorter than the predetermined distance when the present absolute position information is acquired, the information processing apparatus 10 according to the fourth embodiment selects the position information that is the predetermined distance or more away from the present absolute position information, from among the position information of the transmitters 20 identified in advance by the transmitter position information identifying unit 104, and treats the selected position information of the transmitter 20 as the last absolute position information. Hence, even when the interval of the transmitter 20 is relatively short compared with the extent of the receivable range, the distance between the transmitters 20 used in the positioning is longer than the predetermined distance, and thereby the error of the direction correction amount is suppressed to a small value.

<3-5. Fifth Embodiment>

In the above, the fourth embodiment has been described. Subsequently, the fifth embodiment will be described.

First, description will be made of the background that has led the fifth embodiment to be created. In the first to fourth embodiments, the method of correcting the autonomous direction information has been described, under the premise that the cause of the error of the autonomous direction information is the error of the initial direction information. On the other hand, as the cause of the error of the autonomous direction information, the offset error of the gyroscope 168 of the information processing apparatus 10 is considered as well.

More specifically, it is possible that the gyroscope 168 has a certain measurement error due to the limitation of the device. For example, even when the gyroscope 168 is originally designed to measure "0" in the angular acceleration to be "5000" in the digital quantity, it is possible that the gyroscope 168 measure "0" in the angular acceleration to be "5010" in the digital quantity due to the measurement error of the voltage. This measurement error is accumulated as the information processing apparatus 10 travels, and as a result the autonomous direction information deviates increasingly from the real direction information as time passes.

As described later, according to the fifth embodiment, the direction correction amount is calculated in such a manner to make the error included in the direction correction amount smaller, when the offset error of the gyroscope is included as the cause of the error of the autonomous direction information.

[3-5-1. Configuration of Information Processing Apparatus 10]

The components of the information processing apparatus 10 according to the fifth embodiment are same as the components in the first embodiment. In the following, only components having a different function from the first embodiment will be described.

(3-5-1-1. Direction Correcting Unit 108)

When the observed direction error angle is larger than a threshold value, the direction correcting unit 108 according to the fifth embodiment adjusts the observed direction error angle on the basis of the difference between the acquisition time of the present absolute position information and the acquisition time of the last absolute position information, in order to calculate the direction correction amount. Also, when the observed direction error angle is equal to or smaller than the threshold value, the direction correcting unit 108 calculates the observed direction error angle as the direction correction amount. Here, the threshold value is the theoretical maximum value of the error that may be included in the observed direction error angle.

Figure 21:
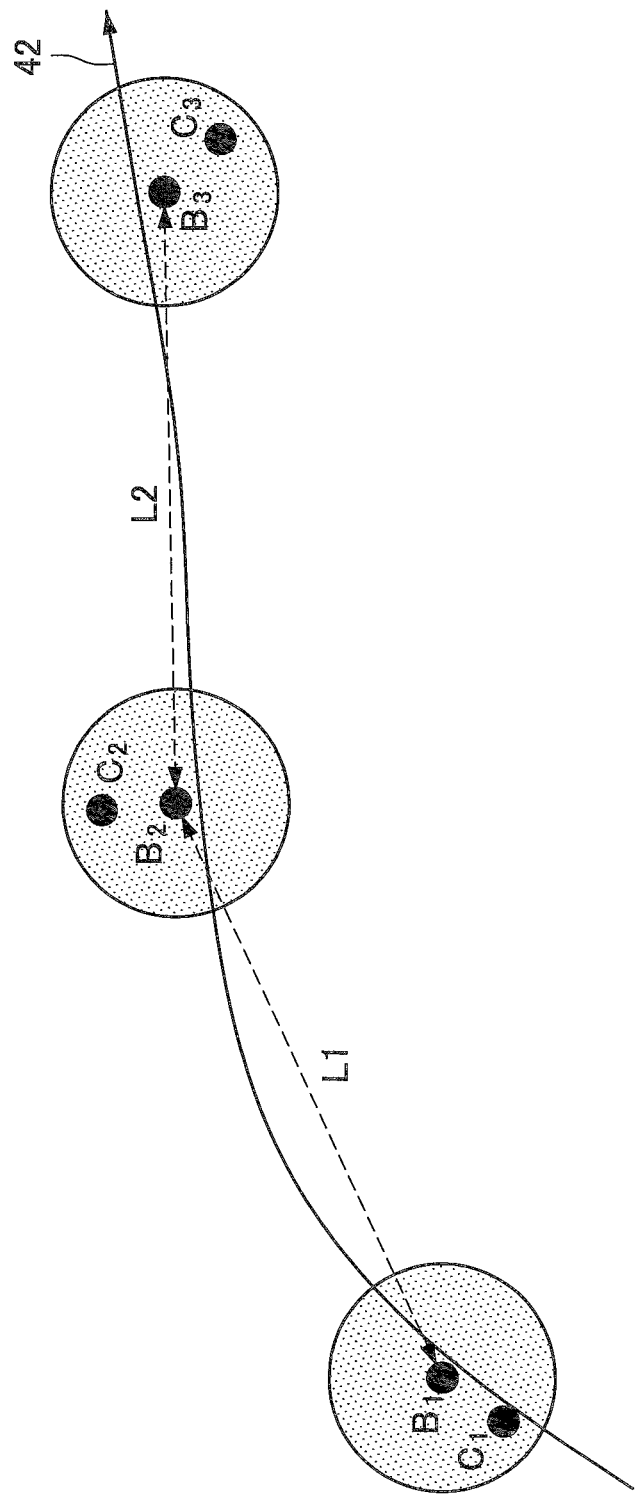
FIG. 21 is an explanatory diagram illustrating an example of an identification of autonomous position information by an autonomous position and direction information identifying unit 102 according to a fifth embodiment of the present disclosure.

Here, with reference to FIG. 21, the above function will be described in more detail. FIG. 21 is an explanatory diagram illustrating an example in which the absolute position information is acquired at each of positions $C_1$, $C_2$, and $C_3$ when the information processing apparatus 10 travels along the traveling trajectory 42.

First, the observed direction error angle at the position $C_2$ illustrated in FIG. 21 will be considered. Assuming that the cause of the error of the autonomous direction information is only the error of the initial direction information, the maximum value of the error that may be included in the observed direction error angle when the last absolute position is $B_1$ and the present absolute position is $B_2$ at the position $C_2$ will be a value that is equal to or smaller than $\theta_{max}$ defined in the following formula (3).

$$\theta_{max} = \sin^{-1}\frac{2R}{L1} \qquad \text{Formula (3)}$$

Next, the error of the autonomous direction information at the position $C_3$ will be considered. Again, assuming that the cause of the error of the autonomous direction information is only the error of the initial direction information, the observed direction error angle when the last absolute position is $B_2$ and the present absolute position is $B_3$ at the position $C_3$ will be theoretically equal to or smaller than above $\theta_{max}$. This is because the error of the initial direction information is corrected by the correction at the position $C_2$.

If the observed direction error angle actually calculated at the position $C_3$ is larger than above $\theta_{max}$, the offset error of the gyroscope 168 is supposed to be included as the cause of the error of the autonomous direction information in addition to the error of the initial direction information. Hence, when the observed direction error angle at the position $C_3$ is larger than above $\theta_{max}$, the direction correcting unit 108 calculates the direction correction amount ($\Delta D'$) by the following formula (4), in order to correct the offset error of the gyroscope 168.

$$\Delta D' = \Delta D - \frac{\Delta D - \theta_{max}}{\Delta t} \qquad \text{Formula (4)}$$

Note that, in the formula (4), $\Delta D$ is defined as the observed direction error angle, and $\Delta t$ is defined as the difference between the acquisition time of the present absolute position information (i.e., the time at the site $C_3$) and the acquisition time of the last absolute position information (i.e., the time at the site $C_2$).

[3-5-2. Operation]

In the above, description has been made of the configuration according to the fifth embodiment. Subsequently, description will be made of the operation according to the fifth embodiment.

Figure 22:
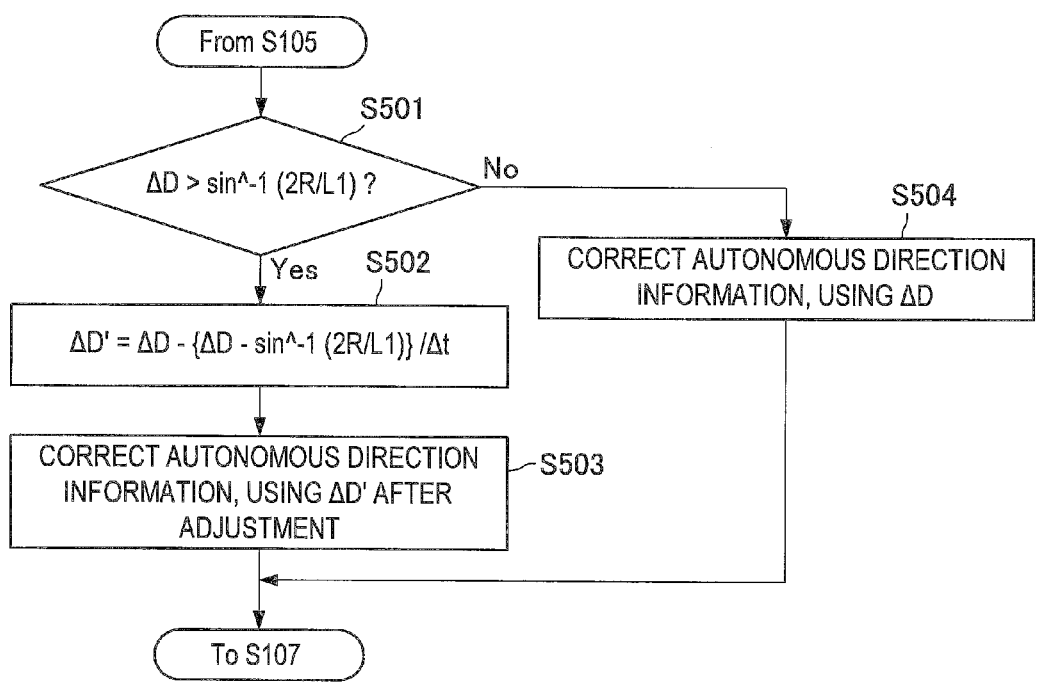
FIG. 22 is a flowchart illustrating a part of an operation according to the fifth embodiment.

FIG. 22 is a flowchart illustrating the operation according to the fifth embodiment. Note that the operation from S101 to S105 is same as that in the first embodiment, and therefore the description thereof is omitted in FIG. 22. As illustrated in FIG. 22, after S105, the direction correcting unit 108 determines whether or not $\Delta D$ calculated in S105 is larger than $\theta_{max}$ in the above formula (3) (S501). If $\Delta D$ is equal to or smaller than $\theta_{ma}$ (S501: No), the direction correcting unit 108 corrects the present autonomous direction information, using ΔD calculated in S105 (S504).

On the other hand, if ΔD is larger than $\theta_{ma}$, (S501: Yes), the direction correcting unit 108 calculates the direction correction amount ΔD', which is obtained by adjusting ΔD using the above formula (4) (S502).

Then, the direction correcting unit 108 corrects the present autonomous direction information, using ΔD' calculated in S502 (S503).

Note that the operation after S503 is same as the operation in and after S107 in the first embodiment.

[3-2-3. Effect]

In the above, as described with reference to FIGS. 21 and 22, when the observed direction error angle is larger than the threshold value, the information processing apparatus 10 according to the fifth embodiment subtracts the value according to the difference between the acquisition time of the present absolute position information and the acquisition time of the last absolute position information, from the observed direction error angle, in order to calculate the direction correction amount. Hence, when not only the error of the initial direction information but also the offset error of the gyroscope 168 is supposed to be included as the cause of the error of the autonomous direction information, the direction correction amount is calculated in such a manner to make the error included in the direction correction amount smaller.

<<4. Variant Example>>

It should be understood by those skilled in the art that various modifications, combinations, sub-combinations and alterations may occur depending on design requirements and other factors insofar as they are within the scope of the appended claims or the equivalents thereof.

<4-1. Variant Example 1>

For example, although an example in which the information processing apparatus in an embodiment of the present disclosure is the device of a portable type is mainly described in the above, the present disclosure is not limited to such an example. As a variant example 1, an applicable configuration is such that the information processing apparatus in an embodiment of the present disclosure is a device of a server type (hereinafter, referred to as the server device 60), and the object in an embodiment of the present disclosure is a device of the portable type (hereinafter, referred to as the portable device 70).

In the variant example 1, for example, the portable device 70 identifies the autonomous position information and the autonomous direction information by the acceleration sensor 166, the gyroscope 168, and the like of the portable device 70, and transmits the identified autonomous position information and the identified autonomous direction information to the server device 60 by wireless communication. Further, when the portable device 70 receives the information of the transmitter from the transmitter 20 by the GNSS receiver 170, the indoor absolute position information receiving device 172, or the like of the portable device 70, the portable device 70 transmits the received information of the transmitter to the server device 60 by the wireless communication.

Then, the server device 60 identifies the position information of the transmitter 20 with reference to the transmitter database 132 of the server device 60 for example, on the basis of the information of the transmitter received from the portable device 70, and acquires the position information of the portable device 70. Further, the server device 60 calculates the direction correction amount for correcting the received autonomous direction information, on the basis of the acquired absolute position information of the portable device 70 and the autonomous position information received from the portable device 70. Then, the server device 60 transmits the calculated direction correction amount to the portable device 70, to cause the portable device 70 to correct the autonomous direction information.

According to the variant example 1, the server device 60 acquires the position information of the portable device 70, and calculates the correction amount of the autonomous direction information and the autonomous position information. Hence, the portable device 70 corrects the autonomous direction information and the autonomous position information, only by receiving the direction correction amount calculated by the server device 60 and the absolute position information acquired by the server device 60, without calculating the direction correction amount by itself.

<4-2. Variant Example 2>

Also, in the above description, description has been made of an example in which the information processing apparatus 10 acquires the absolute position information by receiving the radio wave in accordance with a standard such as for example Bluetooth and Wi-Fi from the transmitter 20, but the information processing apparatus 10 is not limited to such an example. For example, the information processing apparatus 10 may acquire the absolute position information by receiving visible light from the transmitter 20.

<4-3. Variant Example 3>

Also, in the above description, description has been made of an example in which the information processing apparatus 10 acquires the position information of the transmitter 20 as the absolute position information of the information processing apparatus 10 by receiving the information of the transmitter from one transmitter 20, but the information processing apparatus 10 is not limited to such an example. The information processing apparatus 10 may acquire the absolute position information of the information processing apparatus 10 on the basis of the information of each transmitter received at a time from a plurality of the transmitters 20. For example, when the information processing apparatus 10 receives respective position information from a plurality of the transmitters 20, the information processing apparatus 10 may acquire the absolute position information of the information processing apparatus 10 by triangulating on the basis of the magnitudes of respective receiving radio waves.

<4-3. Variant Example 4>

Also, according to each embodiment of the present disclosure, a computer program for causing the hardware such as the CPU 150, the ROM 152, and the RAM 154 to carry out a function equivalent to each component of the information processing apparatus 10 described above may be provided. Also, a recording medium on which the computer program is recorded is provided.

Additionally, the present technology may also be configured as below:

(1) An information processing apparatus including:

a position information acquiring unit configured to acquire first position information of an object;

a provisional position and direction information acquiring unit configured to acquire provisional position information and provisional direction information based on a movement of the object with reference to the first position information, when second position information of the object is acquired; and a direction correcting unit configured to calculate a direction correction amount for correcting the provisional direction information, according to a distance between the first position information and the second position information, on the basis of the first position information, the second position information, and the provisional position information.

(2) The information processing apparatus according to (1), wherein
the direction correcting unit calculates the direction correction amount by adjusting an angle formed by a straight line linking the provisional position information and the first position information and a straight line linking the second position information and the first position information, on the basis of the distance between the first position information and the second position information.

(3) The information processing apparatus according to (2), wherein the direction correcting unit calculates the direction correction amount by multiplying the angle by a value according to the distance between the first position information and the second position information.

(4) The information processing apparatus according to (2) or (3), wherein
the direction correcting unit calculates the angle as the direction correction amount, when the distance between the first position information and the second position information is equal to or longer than a predetermined distance.

(5) The information processing apparatus according to any one of (1) to (4), wherein
the object is the information processing apparatus,
the information processing apparatus further includes
a receiver unit configured to receive information of a transmitter from the transmitter, and
a transmitter position information identifying unit configured to identify position information of the transmitter on the basis of the received information of the transmitter, and
the position information acquiring unit acquires position information of the transmitter identified by the transmitter position information identifying unit, as position information of the information processing apparatus.

(6) The information processing apparatus according to (5), wherein
the information of the transmitter is the position information of the transmitter.

(7) The information processing apparatus according to (5), wherein
the information of the transmitter is identification information of the transmitter, and
the transmitter position information identifying unit identifies position information of the transmitter corresponding to the received identification information of the transmitter, from a database recording identification information of transmitters and position information of transmitters in association with each other.

(8) The information processing apparatus according to any one of (5) to (7), wherein
the position information acquiring unit does not acquire position information of the information processing apparatus, while the information of the transmitter is not being received from the transmitter.

(9) The information processing apparatus according to any one of (5) to (8), further including:
a measurement unit configured to measure a movement of the information processing apparatus; and
a relative position and direction information identifying unit configured to identify relative position information with reference to the first position information, and relative direction information, on the basis of the measured movement of the information processing apparatus, and
wherein the provisional position and direction information acquiring unit acquires the relative position information and relative direction information that are identified by the relative position and direction information identifying unit when the second position information is acquired, as the provisional position information and the provisional direction information, respectively.

(10) The information processing apparatus according to (9), wherein
the relative position and direction information identifying unit identifies the relative position information and the relative direction information a plurality of times, and
when the relative position and direction information identifying unit identifies the plurality of pieces of relative position information while the receiver unit is receiving information of a transmitter located at a position indicated by the second position information from the transmitter, the provisional position and direction information acquiring unit acquires one of the plurality of pieces of identified relative position information as the provisional position information.

(11) The information processing apparatus according to (10), wherein
the provisional position and direction information acquiring unit acquires, as the provisional position information, relative position information identified at a closest time to an average value of identified times from among the plurality of pieces of identified relative position information.

(12) The information processing apparatus according to (10), wherein
the provisional position and direction information acquiring unit acquires, as the provisional position information, relative position information that is closest to position information obtained by averaging the plurality of pieces of relative position information from among the plurality of pieces of identified relative position information.

(13) The information processing apparatus according to any one of (5) to (12), wherein
the direction correcting unit treats position information of the transmitter that is a predetermined distance or more away from the second position information, as the first position information, from among position information of one or more transmitters identified in advance by the transmitter position information identifying unit, when the distance between the first position information and the second position information is shorter than the predetermined distance at a time when the second position information is acquired.

(14) The information processing apparatus according to any one of (1) to (13), wherein
the provisional position and direction information acquiring unit further acquires second provisional position information and second provisional direction information based on the movement of the object with reference to the second position information, when third position information of the object is further acquired, and
the direction correcting unit further calculates a second direction correction amount by adjusting a second angle formed by a straight line linking the second provisional position information and the second position information and a straight line linking the third position information and the second position information, on the basis of a difference between an acquisition time of the third position information and an acquisition time of the second position information, when the second angle is larger than a threshold value.

(15) The information processing apparatus according to (14), wherein
the direction correcting unit calculates the second angle as the second direction correction amount, when the second angle is equal to or smaller than the threshold value.

(16) The information processing apparatus according to (15), wherein
the threshold value is a value according to the distance between the first position information and the second position information, and a receivable distance of information of a transmitter located at a position indicated by the first position information from the transmitter.

(17) The information processing apparatus according to any one of (1) to (16), further including:
a position information correcting unit configured to correct the provisional position information on the basis of the second position information.

(18) The information processing apparatus according to (17), wherein
the position information correcting unit corrects the provisional position information to the second position information.

(19) An information processing method including:
acquiring first position information of an object;
acquiring provisional position information and provisional direction information based on a movement of the object with reference to the first position information, when second position information of the object is acquired; and
calculating, by a processor, a direction correction amount for correcting the provisional direction information, according to a distance between the first position information and the second position information, on the basis of the first position information, the second position information, and the provisional position information.

(20) A program for causing a computer to function as:
a position information acquiring unit configured to acquire first position information of an object;
a provisional position and direction information acquiring unit configured to acquire provisional position information and provisional direction information based on a movement of the object with reference to the first position information, when second position information of the object is acquired; and
a direction correcting unit configured to calculate a direction correction amount for correcting the provisional direction information, according to a distance between the first position information and the second position information, on the basis of the first position information, the second position information, and the provisional position information.

What is claimed is:

1. An information processing apparatus comprising:
a position information acquiring unit configured to acquire first position information of an object;
a provisional position and direction information acquiring unit configured to acquire provisional position information and provisional direction information based on a movement of the object with reference to the first position information, when second position information of the object is acquired; and
a direction correcting unit configured to calculate a direction correction amount for correcting the provisional direction information, according to a distance between the first position information and the second position information, on the basis of the first position information, the second position information, and the provisional position information, wherein
the object is the information processing apparatus,
the information processing apparatus further comprises
a receiver unit configured to receive information of a transmitter from the transmitter, and
a transmitter position information identifying unit configured to identify position information of the transmitter on the basis of the received information of the transmitter, and
the position information acquiring unit is configured to acquire the position information of the transmitter identified by the transmitter position information identifying unit, as position information of the information processing apparatus.

2. The information processing apparatus according to claim 1, wherein
the direction correcting unit is configured to calculate the direction correction amount by adjusting an angle formed by a straight line linking the provisional position information and the first position information and a straight line linking the second position information and the first position information, on the basis of the distance between the first position information and the second position information.

3. The information processing apparatus according to claim 2, wherein
the direction correcting unit is configured to calculate the direction correction amount by multiplying the angle by a value according to the distance between the first position information and the second position information.

4. The information processing apparatus according to claim 2, wherein
the direction correcting unit is configured to calculate the angle as the direction correction amount, when the distance between the first position information and the second position information is equal to or longer than a predetermined distance.

5. The information processing apparatus according to claim 1, wherein
the information of the transmitter is the position information of the transmitter.

6. The information processing apparatus according to claim 1, wherein
the information of the transmitter is identification information of the transmitter, and
the transmitter position information identifying unit is configured to identify position information of the transmitter corresponding to the received identification information of the transmitter, from a database recording identification information of transmitters and position information of transmitters in association with each other.

7. The information processing apparatus according to claim 1, wherein
the position information acquiring unit is configured to not acquire position information of the information processing apparatus, while the information of the transmitter is not being received from the transmitter.

8. The information processing apparatus according to claim 1, further comprising:
a measurement unit configured to measure a movement of the information processing apparatus; and
a relative position and direction information identifying unit configured to identify relative position information with reference to the first position information, and relative direction information, on the basis of the measured movement of the information processing apparatus, and
wherein the provisional position and direction information acquiring unit is configured to acquire the relative position information and relative direction information that are identified by the relative position and direction information identifying unit when the second position information is acquired, as the provisional position information and the provisional direction information, respectively.

9. The information processing apparatus according to claim 8, wherein the relative position and direction information identifying unit is configured to identify the relative position information and the relative direction information a plurality of times, and when the relative position and direction information identifying unit is configured to identify the plurality of pieces of relative position information while the receiver unit is receiving information of a transmitter located at a position indicated by the second position information from the transmitter, the provisional position and direction information acquiring unit is configured to acquire one of the plurality of pieces of identified relative position information as the provisional position information.

10. The information processing apparatus according to claim 9, wherein the provisional position and direction information acquiring unit is configured to acquire, as the provisional position information, relative position information identified at a closest time to an average value of identified times from among the plurality of pieces of identified relative position information.

11. The information processing apparatus according to claim 9, wherein the provisional position and direction information acquiring unit is configured to acquire, as the provisional position information, relative position information that is closest to position information obtained by averaging the plurality of pieces of relative position information from among the plurality of pieces of identified relative position information.

12. The information processing apparatus according to claim 1, wherein the direction correcting unit is configured to treat position information of the transmitter that is a predetermined distance or more away from the second position information, as the first position information, from among position information of one or more transmitters identified in advance by the transmitter position information identifying unit, when the distance between the first position information and the second position information is shorter than the predetermined distance at a time when the second position information is acquired.

13. The information processing apparatus according to claim 1, wherein the provisional position and direction information acquiring unit is further configured to acquire second provisional position information and second provisional direction information based on the movement of the object with reference to the second position information, when third position information of the object is further acquired, and the direction correcting unit is further configured to calculate a second direction correction amount by adjusting a second angle formed by a straight line linking the second provisional position information and the second position information and a straight line linking the third position information and the second position information, on the basis of a difference between an acquisition time of the third position information and an acquisition time of the second position information, when the second angle is larger than a threshold value.

14. The information processing apparatus according to claim 13, wherein the direction correcting unit is configured to calculate the second angle as the second direction correction amount, when the second angle is equal to or smaller than the threshold value.

15. The information processing apparatus according to claim 14, wherein the threshold value is a value according to the distance between the first position information and the second position information, and a receivable distance of information of a transmitter located at a position indicated by the first position information from the transmitter.

16. The information processing apparatus according to claim 1, further comprising:

a position information correcting unit configured to correct the provisional position information on the basis of the second position information.

17. The information processing apparatus according to claim 16, wherein the position information correcting unit is configured to correct the provisional position information to the second position information.

18. An information processing method comprising:
acquiring first position information of an object;
acquiring provisional position information and provisional direction information based on a movement of the object with reference to the first position information, when second position information of the object is acquired; and
calculating, by a processor, a direction correction amount for correcting the provisional direction information, according to a distance between the first position information and the second position information, on the basis of the first position information, the second position information, and the provisional position information, wherein
the object is an information processing apparatus,
the information processing method further comprising
receiving, by the information processing apparatus, information of a transmitter from the transmitter, and
identifying, by the information processing apparatus, position information of the transmitter on the basis of the received information of the transmitter, and
wherein the identified position information of the transmitter is acquired as position information of the information processing apparatus.

19. A non-transitory computer readable storage medium, having stored thereon, a set of instructions executable by a computer, thereby causing the computer to function as:

a position information acquiring unit configured to acquire first position information of an information processing apparatus;

a provisional position and direction information acquiring unit configured to acquire provisional position information and provisional direction information based on a movement of the information processing apparatus with reference to the first position information, when second position information of the information processing apparatus is acquired;

a direction correcting unit configured to calculate a direction correction amount for correcting the provisional direction information, according to a distance between the first position information and the second position information, on the basis of the first position information, the second position information, and the provisional position information;

a receiver unit configured to receive information of a transmitter from the transmitter;
a transmitter position information identifying unit configured to identify position information of the transmitter on the basis of the received information of the transmitter: and
the position information acquiring unit configured to acquire the position information of the transmitter identified by the transmitter position information identifying unit, as position information of the information processing apparatus.

* * * * *